United States Patent
Ochiai

(10) Patent No.: US 9,155,114 B2
(45) Date of Patent: Oct. 6, 2015

(54) COMMUNICATION RELAY APPARATUS, COMMUNICATION RELAY SYSTEM, COMMUNICATION RELAY METHOD, AND COMMUNICATION RELAY PROGRAM

(75) Inventor: Katsuhiro Ochiai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 217 days.

(21) Appl. No.: 13/703,271

(22) PCT Filed: Jun. 6, 2011

(86) PCT No.: PCT/JP2011/063428
§ 371 (c)(1),
(2), (4) Date: Dec. 10, 2012

(87) PCT Pub. No.: WO2011/158765
PCT Pub. Date: Dec. 22, 2011

(65) Prior Publication Data
US 2013/0091555 A1  Apr. 11, 2013

(30) Foreign Application Priority Data
Jun. 15, 2010  (JP) .................. 2010-136268

(51) Int. Cl.
*H04W 76/00* (2009.01)
*H04W 4/22* (2009.01)
(Continued)

(52) U.S. Cl.
CPC ............. *H04W 76/007* (2013.01); *H04L 63/08* (2013.01); *H04W 4/22* (2013.01); *H04W 12/06* (2013.01); *H04W 48/02* (2013.01); *H04W 84/045* (2013.01)

(58) Field of Classification Search
CPC ...... H04W 4/22; H04W 76/007; H04W 48/02

USPC .............................................. 726/4
See application file for complete search history.

(56) References Cited

U.S. PATENT DOCUMENTS 8,515,434 B1 *  8/2013  Narendran et al. ........... 455/446
2007/0218868 A1 *  9/2007  Schefczik et al. ......... 455/404.1
(Continued)

FOREIGN PATENT DOCUMENTS

JP  8-214374 A  8/1996
JP  2010-62711 A  3/2010
JP  2010-118861 A  5/2010

OTHER PUBLICATIONS

Emergency Response Communications and Associated Security Challenges; Muhammad Ibrahim Channa et al.; 2010.*
(Continued)

*Primary Examiner* — James Turchen
(74) *Attorney, Agent, or Firm* — Sughrue Mion, PLLC

(57) ABSTRACT

This invention is directed to acquisition of a communication path for a mobile communication apparatus in a case of occurrence of communications beyond the capacity of a radio base station due to a communication trouble or the like.
A communication relay apparatus comprises: a wireless connection unit that connects with a mobile communication apparatus via a wireless communication path; a wired connection unit that connects with a wired communication path; and an authentication unit that permits, based on a first authentication, the connection of the mobile communication apparatus to the wired communication path and that permits, based on the establishment of a second authentication, the said connection if the first authentication is not established and further if information for permitting the said connection has been registered.

6 Claims, 12 Drawing Sheets

(51) Int. Cl.
*H04W 12/06* (2009.01)
*H04L 29/06* (2006.01)
*H04W 48/02* (2009.01)
*H04W 84/04* (2009.01)

(56) References Cited

U.S. PATENT DOCUMENTS

2008/0305835 A1* 12/2008 Johnstone et al. ............ 455/561
2010/0135205 A1* 6/2010 Li et al. ..................... 370/328
2010/0227611 A1* 9/2010 Schmidt et al. ............... 455/434
2011/0294458 A1* 12/2011 Tiwari ........................ 455/404.1
2012/0009904 A1* 1/2012 Modi et al. .................... 455/413
2013/0072183 A1* 3/2013 Steer et al. .................... 455/423

OTHER PUBLICATIONS

Implementing Wireless Priority Service for CDMA Networks; Michael D Chambers et al; Bell Labs Technical Journal; p. 23-26; 2004.*

* cited by examiner

COMMUNICATION RELAY APPARATUS, COMMUNICATION RELAY SYSTEM, COMMUNICATION RELAY METHOD, AND COMMUNICATION RELAY PROGRAM

CROSS REFERENCE TO RELATED APPLICATIONS

This application is a National Stage of International Application No. PCT/JP2011/063428 filed Jun. 6, 2011, claiming priority based on Japanese Patent application No. 2010-136268 filed Jun. 15, 2010, the contents of all of which are incorporated herein by reference in their entirety.

TECHNICAL FIELD

The present invention relates to a relay apparatus of a wireless communication, and in particular, a communication relay apparatus which relays between a wireless communication and a wired communication.

BACKGROUND ART

A mobile communication apparatus 50 (MS: Mobile Station) which uses wireless such as a mobile phone or a PHS (Personal Handy-phone System) or the like shown in FIG. 12,communicates using a communication system 9. In the communication system 9, the mobile communication apparatus 50 connects with a wireless base station 29 (BTS: Base Transfer Station) via a wireless communication path 60. Moreover, the wireless base station 29 is connected with an exchange office 43 which is composed of a base station control apparatuses (RNC: Radio Network Controller) and a mobile exchange office (MMS: Mobile Multimedia Switching System) via a wireless or a wired dedicated telecommunication network 42 of a respective communications service provider. The exchange offices 43 are mutually connected via a Public Switched Telephone Networks (PSTN: Public Switched Telephone Networks) 44. In this way, the mobile communication apparatuses 50 are mutually connected via the wireless base station 29 and afterwards communications infrastructures.

A general wireless base station 29 connects with the mobile communication apparatuses 50 which are locating within radius range from hundreds meters to ten-several kilometers, and connects the mobile communication apparatuses 50 in a limit of communication capacity in the case that these are the mobile communication apparatuses 50 of the same communication service provider and the same communication method. In other words, the general wireless base station 29 has no limitations on number of connectable mobile communication apparatuses 50.

Besides this kind of the wireless base station, there is a base station called a femtocell, rang of connection of which is tens meters radius and which is used in a home or in an office (refer to the patent literature 1). The femtocell has a connectable range of tens meters radius and does not correspond to a large movement of the mobile communication apparatus which is being connected, and aims at providing a stable and high speed connection with a wired communication network compared with a general wireless communication network for the mobile communication apparatuses. Therefore, in the case that the wired communication line of the femtocell is used by other users, the femtocell cannot provide a communication of the wired communication network to the mobile communication apparatus of a use who installs the femtocell. Accordingly, in order to limit the connection by other users, the femtocell registers the mobile communication apparatuses which can be connected with the femtocell.

Patent Literature 1

Japanese Patent Application Laid-Open No. 2010-062711

DISCLOSURE OF INVENTION

Problems to be Solved by the Invention

The wireless base station has a limit to the number of the mobile communication apparatuses which can be connected simultaneously. This is because, since number of the radio frequency allocations assigned to a wireless base station is limited, the wireless base station cannot relay the communication of the mobile communication apparatus beyond a capacity.

Therefore, when a large number of the mobile communication apparatuses try to communicate simultaneously such as in the case of occurrence of a large-scale disaster or in the case that a communication capacity is decreased due to a failure of the wireless communication system, number of the mobile communication apparatuses which request the connection with the wireless base station exceeds beyond connectable capacity of the wireless base station. Therefore, in these kinds of cases, the mobile communication apparatus cannot connect.

In contrast, by increasing the number of the wireless base stations up to an assumed number so as to cover even at a time of disaster or failure of the communication system, it can ensure the connection of the mobile communication apparatuses. However, considering a construction cost and a maintenance cost of these facilities, it is difficult to realize that it installs the wireless base stations in order to cover even at a time of disaster which rarely occurs.

On the other hand, the base station something like the above-mentioned femtocell described in the patent literature 1 does not change the number of the mobile communication apparatuses which is registered at a time of disaster. Therefore, the registered mobile communication apparatus can connect with the base station even at a time of disaster. However, the femtocell cannot connect with the mobile communication apparatus which is not registered even at a time of disaster.

The object of the present invention is to settle the above-mentioned problem, and provide a communication relay apparatus, a communication relay system, a communication relay method and a communication relay program which can permit the connection with the mobile communication apparatus that requested the emergency communications.

Means for Solving Problem

The communication relay apparatus according to the present invention is characterized by including a wireless connection unit for connecting with a mobile communication apparatus via a wireless communication path, a wired connection unit for connecting with a wired communication path and an authentication unit for permitting a connection of said mobile communication apparatus with said wired communication path based on a first authentication, and in the case that said first authentication is not succeeded, permitting said connection based on success of a second authentication when information for permitting said connection is registered.

The second communication relay apparatus according to the present invention is characterized by including a wireless connection unit for connecting with a mobile communication apparatus via a wireless communication path, a wired connection unit for connecting with a wired communication path and an authentication unit for permitting a connection of said mobile communication apparatus with said wired communication path based on a first authentication, and permitting said connection based on existence of registration of information for permitting said connection when said first authentication is not succeeded.

A communication relay system according to the present invention is characterized by including a communication relay apparatus, further including a wireless connection unit for connecting with a mobile communication apparatus via a wireless communication path, a wired connection unit for connecting with a wired communication path and an authentication unit for permitting a connection of said mobile communication apparatus with said wired communication path based on a first authentication, and in the case that said first authentication is not succeeded, permitting said connection based on success of a second authentication when information for permitting said connection is registered and an emergency operation server for authenticating to an inquiry of said second authentication from said authentication unit of said communication relay apparatus when information for permitting said connection is registered.

A communication relay method according to the present invention is characterized by connecting a mobile communication apparatus with a wired communication path via a wireless communication path, permitting a connection of said mobile communication apparatus with said wired communication path based on a first authentication and permitting said connection based on success of a second authentication when information for permitting said connection is registered in the case that said first authentication is not succeeded.

A communication relay program according to the present invention is characterized by executing with a computer for executing a process of permitting a connection of a mobile communication apparatus with a wired communication path based on a first authentication, and a process of permitting said connection based on success of the second authentication when information for permitting said connection is registered in the case that said first authentication is not succeeded.

Effect of the invention

According to the present invention, a connection can be permitted to a mobile communication apparatus which needs an emergency communication.

EXEMPLARY EMBODIMENT OF THE INVENTION

Next, the present invention will be described with reference to drawings.
(First Exemplary Embodiment)

First, a communication relay system 1 according to the first exemplary embodiment of the present invention will be described with reference to the drawings.

Figure 1:
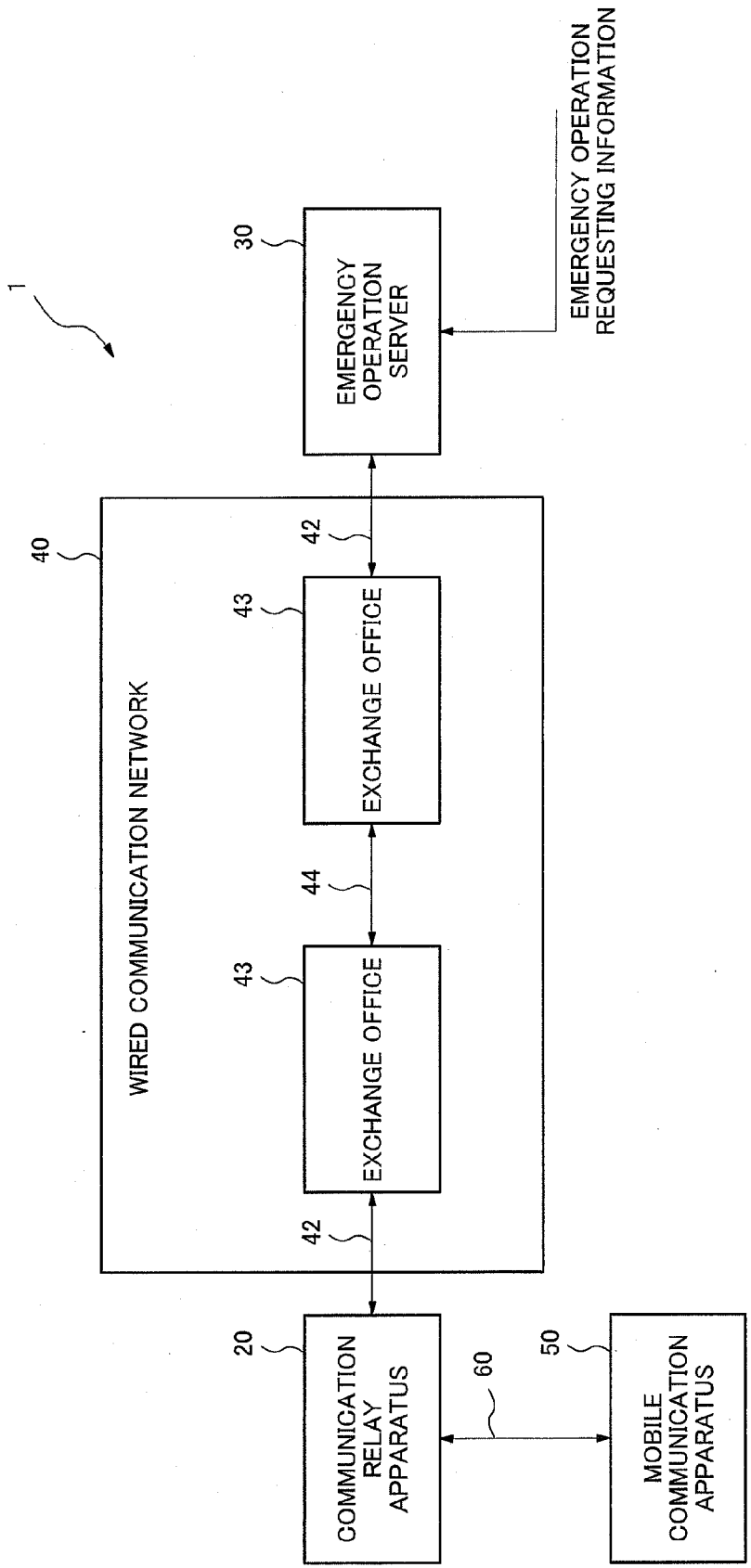
[FIG. 1] a block diagram showing an example of the communication relay system according to the first exemplary embodiment of the present invention

FIG. 1 is the block diagram showing an example of the communication relay system 1 according to the first exemplary embodiment.

The communication relay system 1 includes a communication relay apparatus 20, an emergency operation server 30, a wired communication network 40, the mobile communication apparatus 50 and the wireless communication path 60. Further, it is in order to explain easily, to show the communication relay apparatus 20 and the mobile communication apparatus 50 respectively as single unit. Each apparatus can be configured as a plurality of units.

Figure 12:
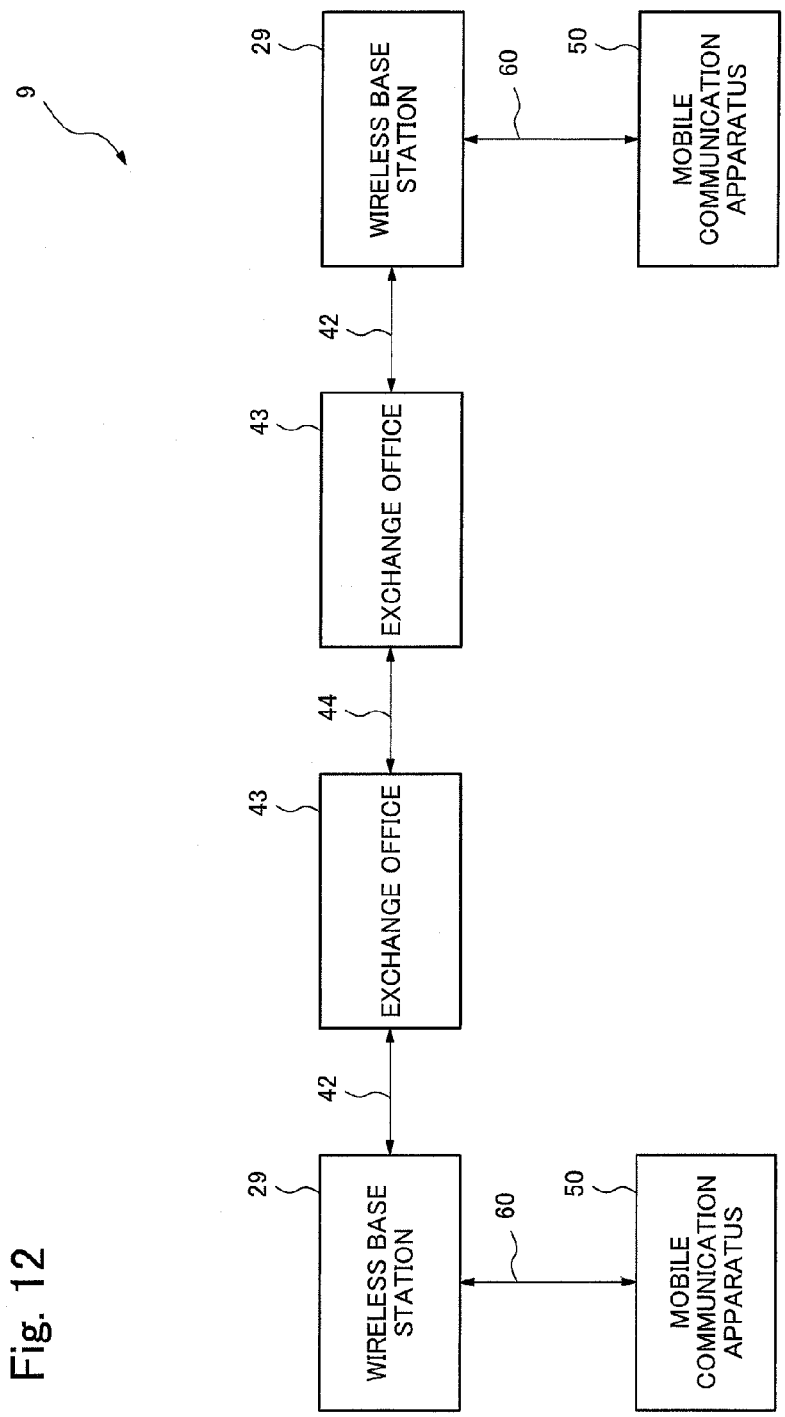
[FIG. 12] a block diagram showing an example of a general communication system

In a normal state, in the same way as that of the general wireless base station 29 shown in FIG. 12, the communication relay apparatus 20 connects with the mobile communication apparatus 50 via the wireless communication path 60, further, and permits connections of the mobile communication apparatus 50 with the wired communication network 40 and relays the communication. However, in the same way as that of the base station for femtocell which have already been described, in advance, the communication relay apparatus 20 registers connectable mobile communication apparatuses 50. Specifically, information for authentication of the connectable mobile communication apparatuses 50 is registered in advance. Hereinafter, for a convenience of the descriptions, it is called "registered" to be registered in the communication relay apparatus 20, and it is called "unregistered" not to be registered in the communication relay apparatus 20". Further, although it will be described later in detail, the communication relay apparatus 20 permits the connection for the communication at a time of disaster or a failure of the communication system based on notification and a result of authentication from the emergency operation server 30. Further, the communication relay apparatus 20 is not only limited to a wireless base station for telephones but also a wireless base station for a wireless LAN (Local Area Network) which connects with computers through a wireless communication.

The emergency operation server 30 receives information of the failure of the wireless communication system or information of the disaster (hereinafter, referred altogether to as emergency operation requesting information) from a notification apparatus which is not shown in the figure, and controls permission of connection of the communication relay apparatus 20.

The wired communication network 40 is a wired communication network for communicating among the communication relay apparatuses 20 (in FIG. 1, other side communication relay apparatus 20 is omitting for a convenience of the descriptions) and connecting the communication relay apparatus 20 to the emergency operation server 30. The wired communication network 40 shown in FIG. 1 is a wired communication network including the dedicated telecommunication network 42 of a communications service provider, the exchange office 43 and the public switched telephone network 44. Thus, the wired communication network 40 may be a communication network similar to a general communication network which connects the wireless base station, and the detailed descriptions are omitted. However, the wired communication network 40 shown in FIG. 1 is an example of the wired communication network 40. The wired communication network 40 is not limited to the telephone line network, but may be a network which is used by a computer such as a wired LAN or an optical fiber.

The mobile communication apparatus 50 is a general telephone such as a mobile phone or a PHS telephone which communicates with the wireless base station, or a personal computer or a mobile information terminal (PDA: Personal Data Assistance) which equip a wireless LAN. As already mentioned above, under a communicating state, the communication relay apparatus 20 according to the exemplary embodiment permits the connection of the registered mobile communication apparatus 50 and relays the communication via the wired communication network 40.

The wireless communication path 60 is a wireless communication path which connects the communication relay apparatus 20 with the mobile communication apparatus 50. As already mentioned above, the wireless communication path 60 may be a general wireless communication path for the mobile phone, or a wireless communication path like a wireless LAN used for a communication among computers. Therefore, detailed descriptions of the wireless communication path 60 are omitted.

Under a normal state, the communication relay system 1 which is configured in this way relays the communication between the registered mobile communication apparatus 50 and another mobile communication apparatus 50 via other communication relay apparatus which is connected with the wired communication network 40 and is not shown in the figure, or a general the wireless base station.

Further, although the communication relay apparatus 20 directly connects with the wired communication network 40 or the dedicated telecommunication network 42 in FIG. 1, this is for convenience sake of the descriptions. The communication relay apparatus 20 according to the exemplary embodiment is not limited to this. For example, the communication relay apparatus 20 may connect with the wired communication network 40 via a communication network or a communication apparatus which are not shown in the figure, such as a home or an enterprise communication network which are not shown in the figure.

And, a connection of the communication relay apparatus 20 according to the exemplary embodiment is not limited to connect physically to a communication network, but includes a logical connection. For example, the connection of the communication relay apparatus 20 may be an establishment of link for a connection with an apparatus which configures the wired communication network 40 or other side apparatus of communication, or participation to communication loop.

Then, a process of the communication relay system 1 in the case that a disaster occurs will be described.

As already mentioned above, the communication relay apparatus 20 communicates with the registered mobile communication apparatus 50. Therefore, because the communication relay apparatus 20 communicates within number of the registered mobile communication apparatus 50 at a time of disaster, it does not exceed the communication capacity. In other words, the communication relay apparatus 20 may communicate with the communication of the registered mobile communication apparatus 50 in the same way as a normal even at a time of disaster. Thus, the communication relay apparatuses 20 does not exceed the communication capacity even at a time of disaster, and leaves a margin of the communication capacity in the case that a part of the registered mobile communication apparatus 50 do not communicate.

As it will be described later in detail, the communication relay system 1 according to the exemplary embodiment assigns the remaining communication capacity of the communication relay apparatus 20 for the communication of the unregistered mobile communication apparatus 50 in the case that it receives the emergency operation requesting information The case when the communication relay system 1 according to the exemplary embodiment receives the emergency operation requesting information will be further described in detail with reference to the drawing.

As it will be described later in detail, in the communication relay system 1 according to the exemplary embodiment, the emergency operation server 30 receives the emergency operation requesting information and, as an immediate action, the communication relay apparatus 20 also connects the unregistered mobile communication apparatus 50 based on the emergency operation requesting information.

Figure 2:
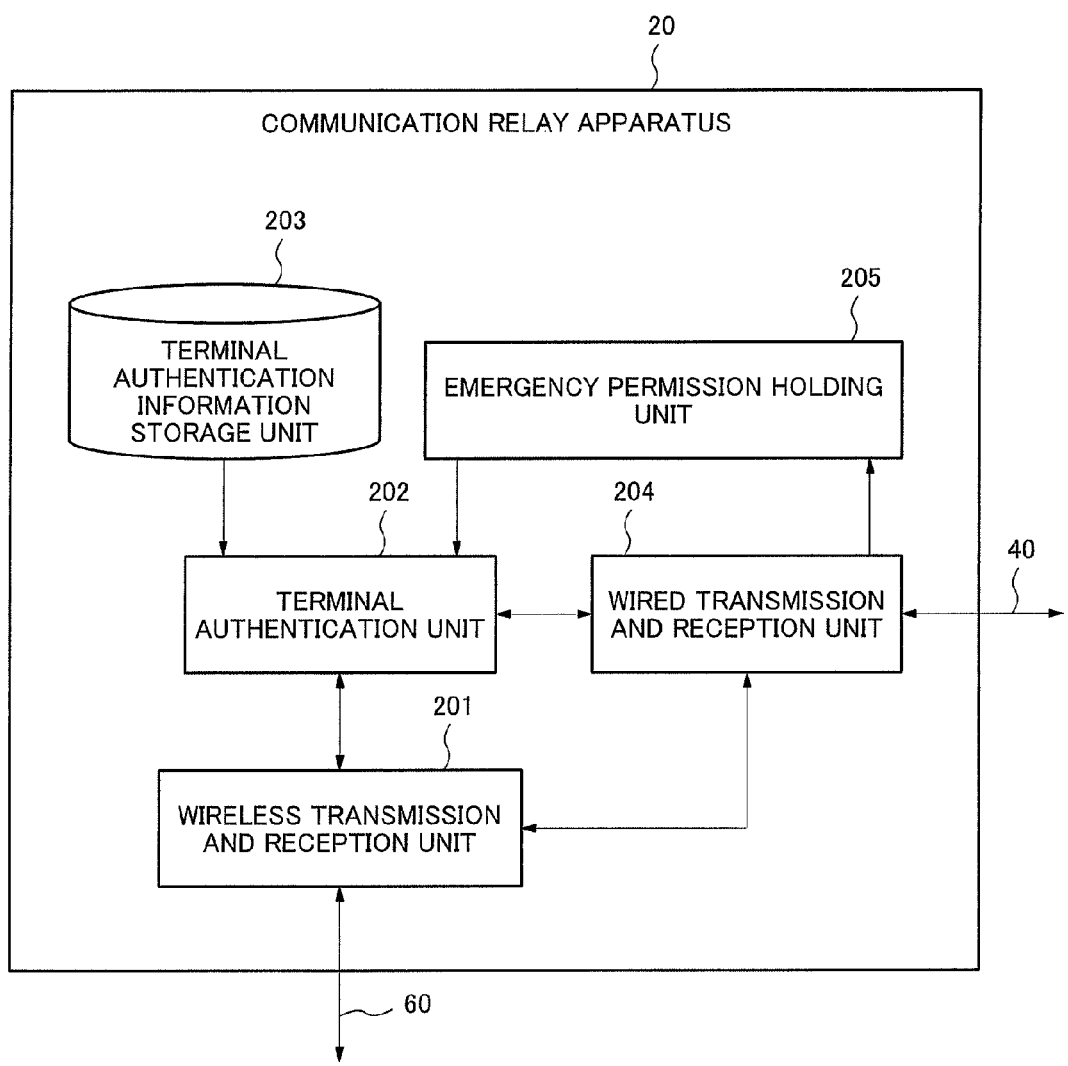
[FIG. 2] a block diagram showing an example of the communication relay apparatus according to the first exemplary embodiment

FIG. 2 is the block diagram showing an example of configuration in relation to a process when the communication relay apparatus 20 according to the exemplary embodiment receives the emergency operation requesting information.

The communication relay apparatus 20 includes a wireless transmission and reception unit 201, a terminal authentication unit 202, a terminal authentication information storage unit 203, a wired transmission and reception unit 204 and an emergency permission holding unit 205.

The wireless transmission and reception unit 201 connects with the mobile communication apparatus 50 via the wireless communication path 60.

The terminal authentication unit 202 is connected with the wireless transmission and reception unit 201 and the wired transmission and reception unit 204, and authenticates the mobile communication apparatus 50 which hopes a connection for relaying the communication based on the authentication information of the terminal which the terminal authentication information storage unit 203 stores. This authentication is called the first authentication in the exemplary embodiment. In the case that the first authentication is succeeded, the terminal authentication unit 202 outputs permission of the connection to the wireless transmission and reception unit 201 and the wired transmission and reception unit 204, and relays the communication of the registered mobile communication apparatus 50. In other words, the communication relay apparatus 20 communicates with the registered mobile communication apparatus 50 which the connection was permitting using the wireless transmission and reception unit 201 and the wired transmission and reception unit 204. As the result, the registered mobile communication apparatus 50 can communicate with the wired communication network 40 via the wireless communication path 60, the wireless transmission and reception unit 201 and the wired transmission and reception unit 204. Further, in the case that the emergency permission holding unit 205 holds the emergency operation requesting information, the terminal authentication unit 202 authenticates permission of the connection of the unregistered mobile communication apparatus 50. This authentication is called the second authentication in the exemplary embodiment.

The terminal authentication information storage unit 203 stores the authentication information for the mobile communication apparatus 50 which the terminal authentication unit 202 uses for the first authentication of the mobile communication apparatus 50. Further, the authentication information which the terminal authentication information storage unit 203 holds in is the authentication information for the mobile communication apparatus 50 which is registered to the communication relay apparatus 20 and which the communication relay apparatus 20 permits the connection in a normal state. For example, the authentication information may be terminal information which is information specific to the terminal. The authentication information is previously stored in the terminal authentication information storage unit 203 by a user or an administrator of the communication relay apparatus 20. Therefore, the descriptions of the detailed process such as registration of the authentication information in the terminal authentication information storage unit 203 will be omitted.

The wired transmission and reception unit 204 relays exchange of information with the emergency operation server 30 via the wired communication network 40 and a communication of the mobile communication apparatus 50

Further, as already mentioned above, the wired transmission and reception unit 204 may connect with the wired communication network 40 directly or via other apparatus or a communication network which is not shown in the figure. And, as already mentioned above, the connection of the wired transmission and reception unit 204 may is either a physical connection or a logical connection.

The emergency permission holding unit 205 receives the emergency operation requesting information from the emergency operation server 30 and holds it. Then, the emergency permission holding unit 205 replies whether the emergency operation requesting information exists or not to the inquiry concerning existence of the emergency operation requesting information from the terminal authentication unit 202. Further, although the communication relay apparatus 20 according to the exemplary embodiment receives the emergency operation requesting information from the emergency operation server 30, it is not limited to this configuration. For example, the communication relay apparatus 20 may receive the emergency operation requesting information from a notification apparatus from which the emergency operation server 30 receives the emergency operation requesting information, and holds it in the emergency permission holding unit 205.

Figure 3:
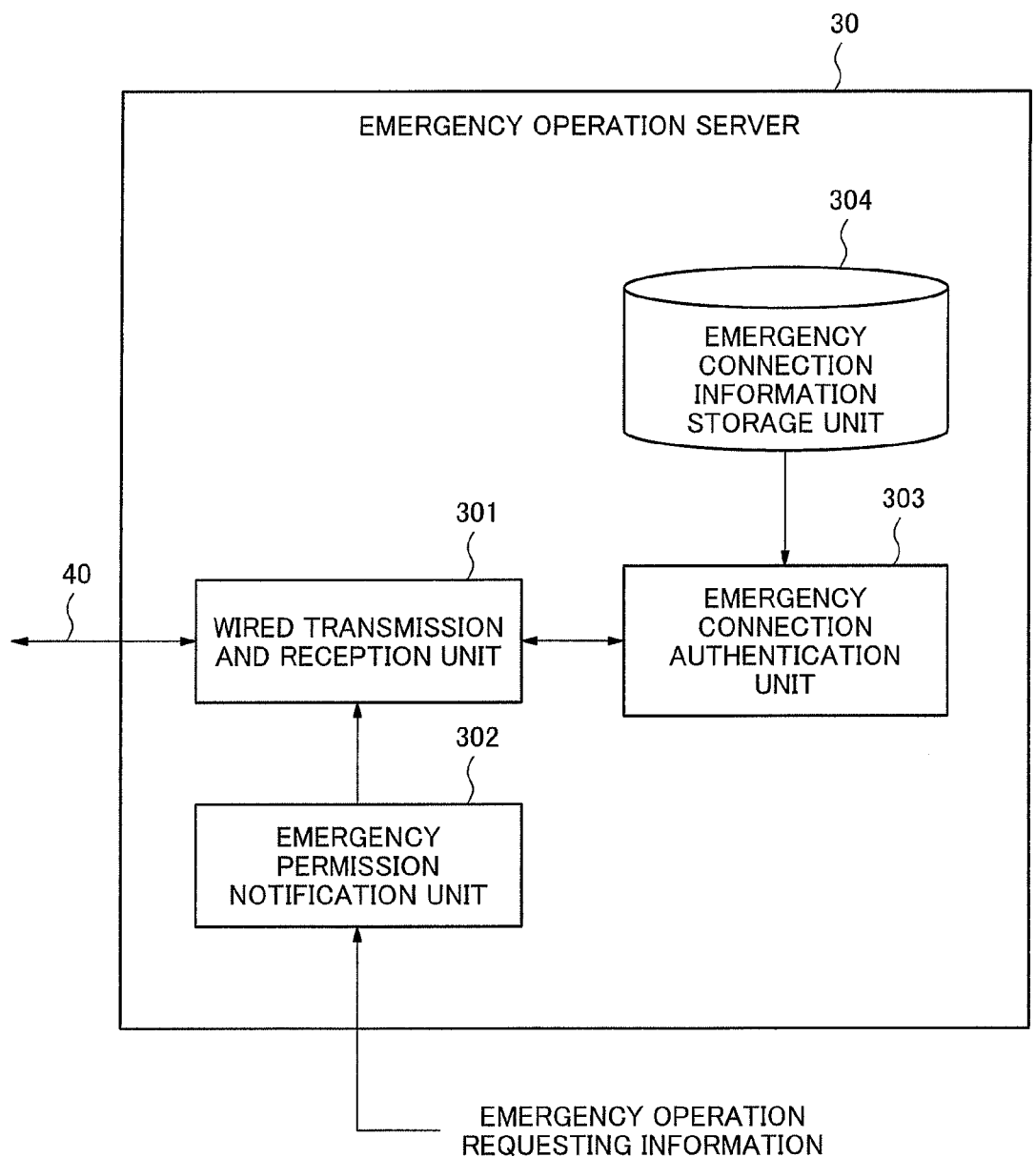
[FIG. 3] a block diagram showing an example of the emergency operation server according to the first exemplary embodiment

FIG. 3 is the block diagram showing an example of configuration of the emergency operation server 30 according to the exemplary embodiment.

The emergency operation server 30 includes a wired transmission and reception unit 301, an emergency permission notification unit 302, an emergency connection authentication unit 303 and an emergency connection information storage unit 304.

The wired transmission and reception unit 301 communicates with the communication relay apparatus 20 via the wired communication network 40.

When the emergency permission notification unit 302 receives the emergency operation requesting information from a notification apparatus which is not shown in the figure, it notifies the emergency operation requesting information to the communication relay apparatus 20 via the wired transmission and reception unit 301. And, the emergency permission notification unit 302 holds the emergency operation requesting information. Further, in the case that the emergency operation server 30 according to the exemplary embodiment receives a notification of release of the emergency operation requesting information from a notification apparatus which is not shown in the figure, the emergency permission notification unit 302 notifies the release of the emergency operation requesting information to the communication relay apparatus 20 via the wired transmission and reception unit 301. However, the exemplary embodiment of the present invention is not limited to this configuration. For example, in the same way as a notification of the emergency operation requesting information, the communication relay apparatus 20 may receive information of the release from a notification apparatus.

While receiving the emergency operation requesting information, the emergency connection authentication unit 303 authenticates whether or not the communication relay apparatus 20 connects with the mobile communication apparatus 50 which requested the connection with the communication relay apparatus 20 (the second authentication), and returns the determined result to the communication relay apparatus 20. Further, while receiving the emergency operation requesting information means while the emergency permission notification unit 302 holds the emergency operation requesting information.

The emergency connection information storage unit 304 stores the authentication information of the mobile communication apparatus 50 which is used when the emergency connection authentication unit 303 authenticates the mobile communication apparatus 50 (second authentication). Further, the emergency connection information storage unit 304 previously stores the authentication information based on the request by an administrator of the emergency operation server 30 or a user of the mobile communication apparatus 50 which is relayed the communication, and detailed descriptions of registration of the authentication information is omitted.

Next, the detailed process of the exemplary embodiment will be described with reference to the drawing.

Figure 4:
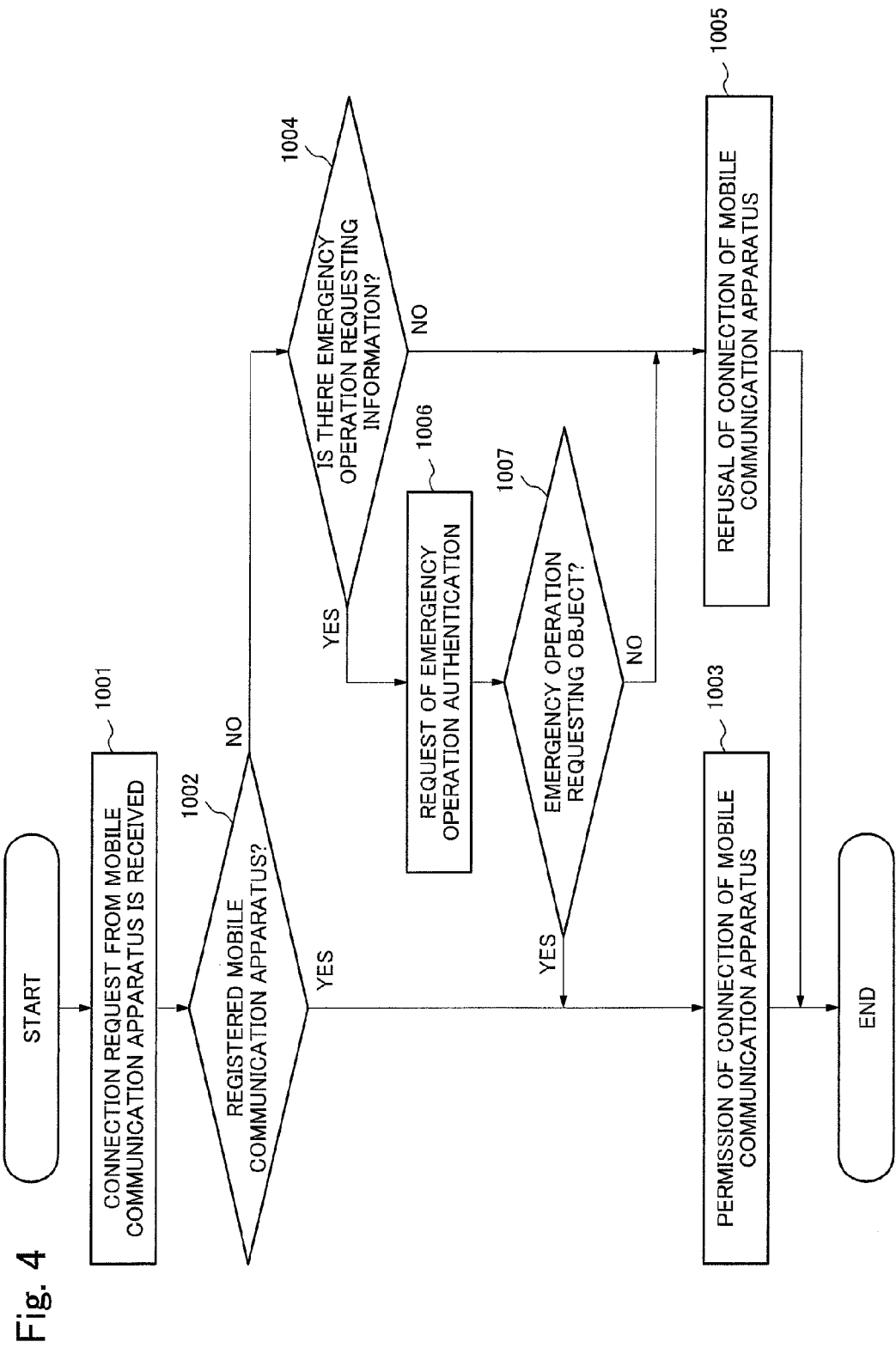
[FIG. 4] a flowchart showing an example of process of the communication relay apparatus according to the first exemplary embodiment

FIG. 4 is the flowchart showing an example of process of the authentication in the communication relay apparatus 20.

The wireless transmission and reception unit 201 of the communication relay apparatus 20 receives the request of the connection from the mobile communication apparatus 50 via the wireless communication path 60 (Step 1001), and transfers the terminal information of the requested mobile communication apparatus 50 to the terminal authentication unit 202. Based on these processes, the first authentication starts.

That is, the terminal authentication unit 202 confirms whether or not the received terminal information is stored in the terminal authentication information storage unit 203 as the authentication information (Step 1002).

In the case that it is stored in the terminal authentication information storage unit 203 (yes, in Step 1002), the requested mobile communication apparatus 50 is the registered mobile communication apparatus 50. Therefore, the terminal authentication unit 202 notifies that the authentication has succeeded (first authentication has succeeded) to the mobile communication apparatus 50 via the wireless transmission and reception unit 201, outputs an instruction of permission of the connection to the wireless transmission and reception unit 201 and the wired transmission and reception unit 204 (Step 1003) and finishes the authentication. After that, the communication relay apparatus 20 communicates in the same way as the normal communication.

On the other hand, in the case that it is not stored in the terminal authentication information storage unit 203 (no, in Step 1002), the terminal authentication unit 202 inquires to the emergency permission holding unit 205 whether or not it holds the emergency operation requesting information (Step 1004).

In the case that the emergency operation requesting information is not held (no, in Step 1004), the terminal authentication unit 202 notifies that it was not authenticated to the mobile communication apparatus 50 via the wireless transmission and reception unit 201, instructs rejection of the connection to the wireless transmission and reception unit 201 (Step 1005) and finishes the authentication.

On the other hand, in the case that the emergency operation requesting information is held (yes, in Step 1004), the terminal authentication unit 202 requests the authentication (second authentication) on whether or not the requested mobile communication apparatus 50 is the mobile communication apparatus 50 of a target object which is permitted the connection while the emergency operation requesting information is held (hereinafter, referred to as emergency operation requesting object) to the emergency operation server 30 via the wired transmission and reception unit 204 (Step 1006). Therefore, the terminal authentication unit 202 transmits information (terminal information) of the mobile communication apparatus 50 which requested the connection in Step 1001 to the emergency operation server 30 via the wired transmission and reception unit 204 and the wired communication network 40.

The terminal authentication unit 202 which received a result of the authentication (second authentication) that the apparatus is a target object of the emergency operation from the emergency operation server 30 via the wired transmission and reception unit 204 determines the result of the authentication (second authentication) (Step 1007).

In the case that the mobile communication apparatus 50 of the emergency operation requesting object (yes, in Step 1007), the terminal authentication unit 202 notifies what is authenticated (the second authentication was succeeded)to the mobile communication apparatus 50 via the wireless transmission and reception unit 201. Further, the terminal authentication unit 202 outputs an instruction of permission of the connection which relays the communication with the mobile communication apparatus 50 to the wireless transmission and reception unit 201 and the wired transmission and reception unit 204 (Step 1003), and finishes the authentication.

On the other hand, in the case that the mobile communication apparatus 50 which is not the emergency operation requesting object (no, in Step 1007), the terminal authentication unit 202 notifies that the second authentication was not succeeded to the mobile communication apparatus 50 via the wireless transmission and reception unit 201. Then, the terminal authentication unit 202 instructs the rejection of the connection to the wireless transmission and reception unit 201 (Step 1005), and finishes the authentication.

Further, according to the exemplary embodiment, although the terminal authentication unit 202 inquires to the emergency permission holding unit 205 in Step 1004, the present invention is not limited to the process. When the emergency permission holding unit 205 receives the emergency operation requesting information, it may notify to the terminal authentication unit 202. The terminal authentication unit 202 may store the notification, and it may not inquire to the emergency permission holding unit 205 in the authentication process of the mobile communication apparatus 50.

Next, the process of the emergency operation server 30 will be described in detail with reference to the drawing.

Figure 5:
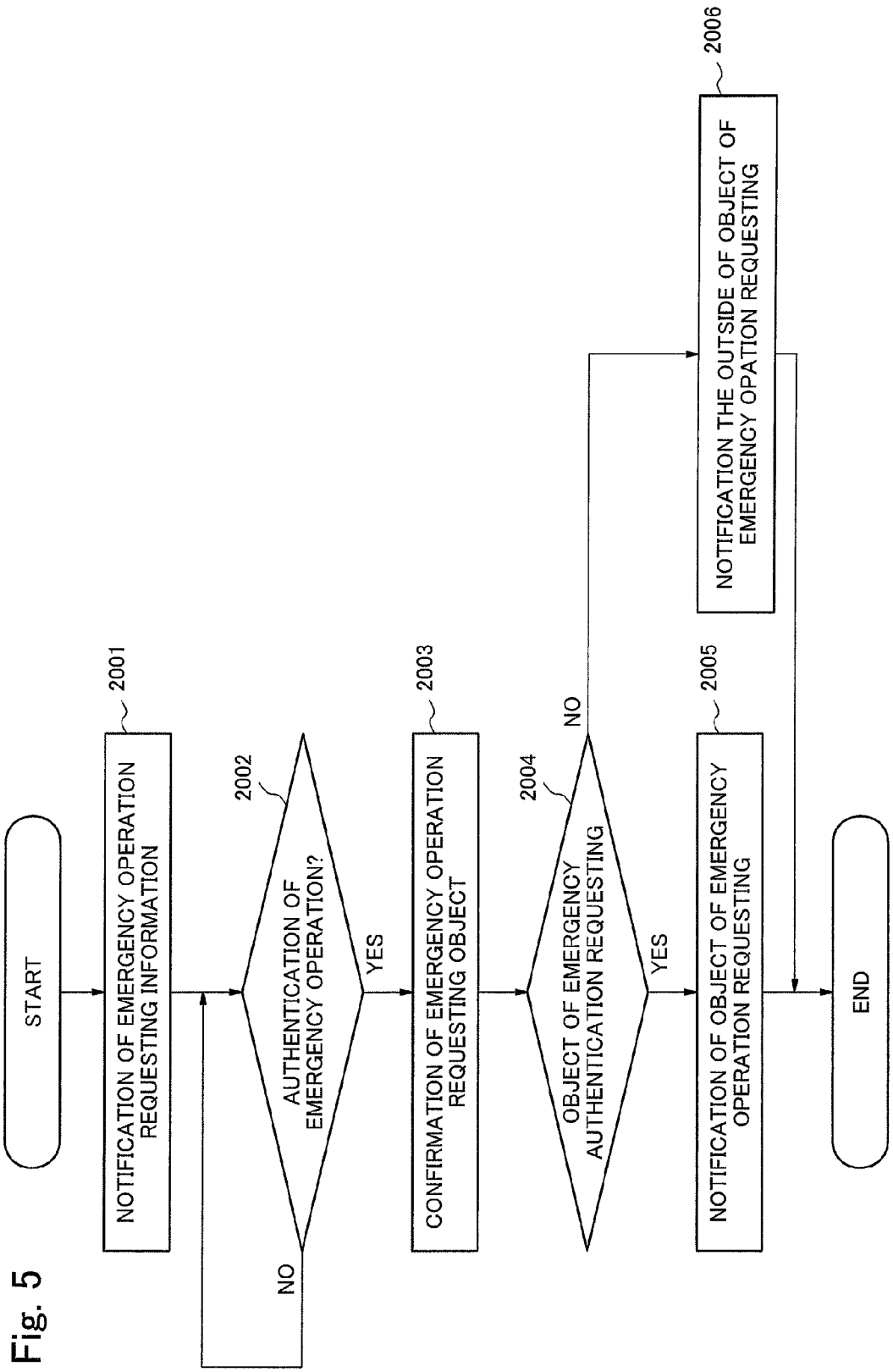
[FIG. 5] a flowchart showing an example of process of the emergency operation server according to the first exemplary embodiment

FIG. 5 is the flowchart showing an example of process of the emergency operation server 30.

The emergency permission notification unit 302 of the emergency operation server 30, which received the emergency operation requesting information from a notification apparatus which is not shown in the figure, notifies the emergency operation requesting information to the communication relay apparatus 20 via the wired transmission and reception unit 301 (Step 2001).

After the notification of the emergency operation requesting information, the emergency operation server 30 waits for a request of the authentication of the emergency operation which is the second authentication from the communication relay apparatus 20 (Step 2002). The emergency connection authentication unit 303, which received a request of the authentication of the emergency operation from the communication relay apparatus 20 via the wired transmission and reception unit 301, confirms whether or not information of the received mobile communication apparatus 50 (terminal information) is stored in the emergency connection information storage unit 304 (confirmation of whether the target object is under the emergency operation) (Step 2003).

In the case that the information of the mobile communication apparatus 50 exists in the emergency connection information storage unit 304 (yes, in Step 2004), namely, in the case of the target object of the emergency operation, the emergency connection authentication unit 303 notifies what is authenticated (second authentication was succeeded) to the communication relay apparatus 20 via the wired transmission and reception unit 301 (Step 2005).

On the other hand, in the case that the information of the mobile communication apparatus 50 does not exist in the emergency connection information storage unit 304 (no, in Step 2004), the emergency connection authentication unit 303 notifies what can not be authenticated (second authentication is failed) to the communication relay apparatus 20 via the wired transmission and reception unit 301 (Step 2006).

Based on the above described processes, in addition to permit the connection of the registered mobile communication apparatus 50 based on the first authentication and relay the communication, the communication relay system 1 according to the first exemplary embodiment can also permit the connection of the mobile communication apparatus 50 of the emergency operation requesting object and relay the communication in the case of receiving the emergency operation requesting information based on the second authentication.

Further, even though the communication relay system 1 according to the first exemplary embodiment, is described that the communication relay apparatus 20 and the emergency operation server 30 are separated apparatuses, it is not limited to the configuration. For example, concerning the communication relay system 1 may realize the communication relay apparatus 20 and the emergency operation server 30 with a single apparatus which equips functions of a switch such as PBX (Private Branch eXchange) and a computer.

And, the communication relay system 1 according to the exemplary embodiment, may realize several units of each apparatus with single unit. For example, the communication relay apparatus 20 may configure the terminal authentication unit 202 with a computer and execute including the emergency permission holding unit 205. This is similar to the emergency operation server 30. For example, the emergency operation server 30 may configure the emergency permission notification unit 302 and the emergency connection authentication unit 303 with single unit.

Following to the above-mentioned descriptions, the communication relay system 1 authenticates the mobile communication apparatus 50 using information stored in advance in the emergency connection information storage unit 304.

However, it is impossible to predict the mobile communication apparatuses 50 which closely exist to the communication relay apparatus 20 at a time of occurrence of a disaster. Therefore, in the case that the communication relay apparatus 20 holds the emergency operation requesting information, it may relay the communication of the mobile communication apparatus 50 which requested to connect as far as the capacity of the communication line permits.

And, according to the exemplary embodiment, even though the first communication relay system 1 registers the emergency operation requesting information as the information for permitting the connection of the mobile communication apparatus 50 with the wired communication network 40, it may be another kind of information for permitting the connection of the emergency communication.

Figure 6:
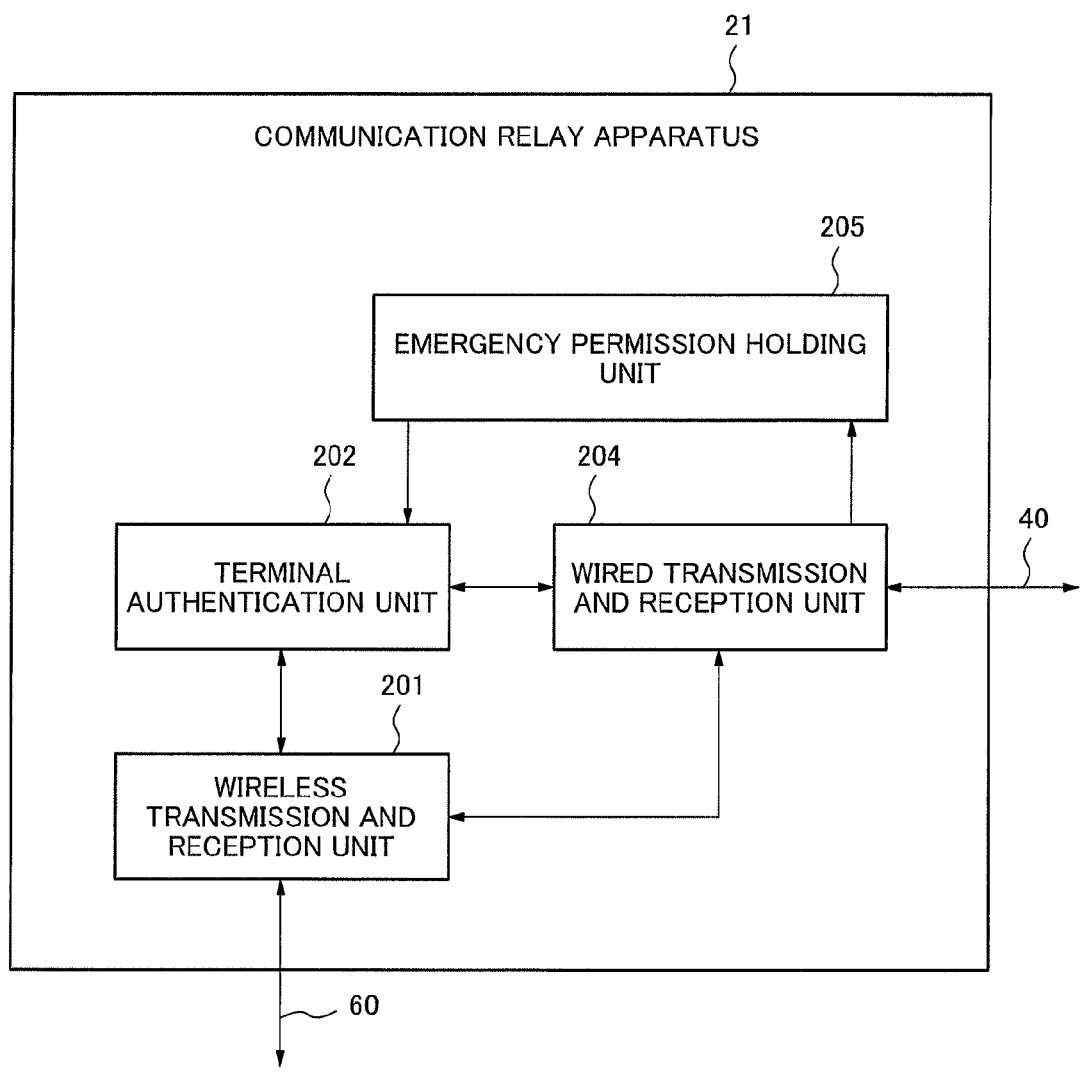
[FIG. 6] a block diagram showing a different example of the communication relay apparatus according to the first exemplary embodiment

FIG. 6 is the block diagram showing an example of a communication relay apparatus 21 which has a different configuration from the communication relay apparatus 20.

In the communication relay apparatus 21, the same configurations as the communication relay apparatus 20 is assigned the same codes, and the detailed descriptions of the configuration is omitted. Further, the terminal authentication information storage unit 203 of the communication relay apparatus 21 is included in the terminal authentication unit 202, and it is omitted in FIG. 6.

The wireless transmission and reception unit 201, which receives the request of connection from the mobile communication apparatus 50 which is not shown in the figure via the wireless communication path 60, transfers the request to the terminal authentication unit 202.

The terminal authentication unit 202 which received the request confirms whether or not the emergency operation requesting information is held in the emergency permission holding unit 205. In the case that the emergency operation requesting information is held, the terminal authentication unit 202 authenticates the requested mobile communication apparatus 50, instructs the permission of the connection to the wireless transmission and reception unit 201 and the wired transmission and reception unit 204 and finishes the authentication.

Based on these kinds of processes, in the case that the communication relay apparatus 21 holds the emergency operation requesting information, it can relay the communication of the mobile communication apparatus 50 which requests the connection.

Further, the communication relay apparatus 21 may secure predetermined capacity of communication line for the registered mobile communication apparatus 50, and provide capacity of the remaining communication line for the mobile communication apparatus 50 which are the emergency operation requesting object.

Further, the communication relay system 1 may realize the communication relay apparatus 20 or the emergency operation server 30 with a computer, and each unit as a program which executes on the computer. Needless to say, the communication relay system 1 may configure the communication relay apparatus 20 and the emergency operation server 30 by the same computer. The communication relay system 1 may read programs which are stored in a recording medium which can be read and written by the computer, and execute.

And, the communication relay apparatus 20 or the emergency operation server 30 is not configured by one apparatus but may be configured by a plurality of apparatuses of which a part or whole are connected via a network or a bus. For example, the terminal authentication information storage unit 203 may be included in an external storage apparatus which is connected via a network or a bus which are not shown in the figure.

Thus, the communication relay system 1 according to the first exemplary embodiment can realize the effect of relaying the communication of the mobile communication apparatus 50 of the emergency operation requesting object, even when a failure which cannot secure capacity of the general wireless base station occurs.

This is because, even when the failure such as at a time of disaster occurs, in the communication relay system 1 according to the first exemplary embodiment, the communication relay apparatus 20 determines existence of registration of the emergency operation requesting information, and permits the connection of the mobile communication apparatus 50 of the emergency operation requesting object based on the second authentication by the emergency operation server 30 in the case of existence of registration.

First Example

Next, in order to describe further the present invention in detail, the first example will be described.

Figure 7:
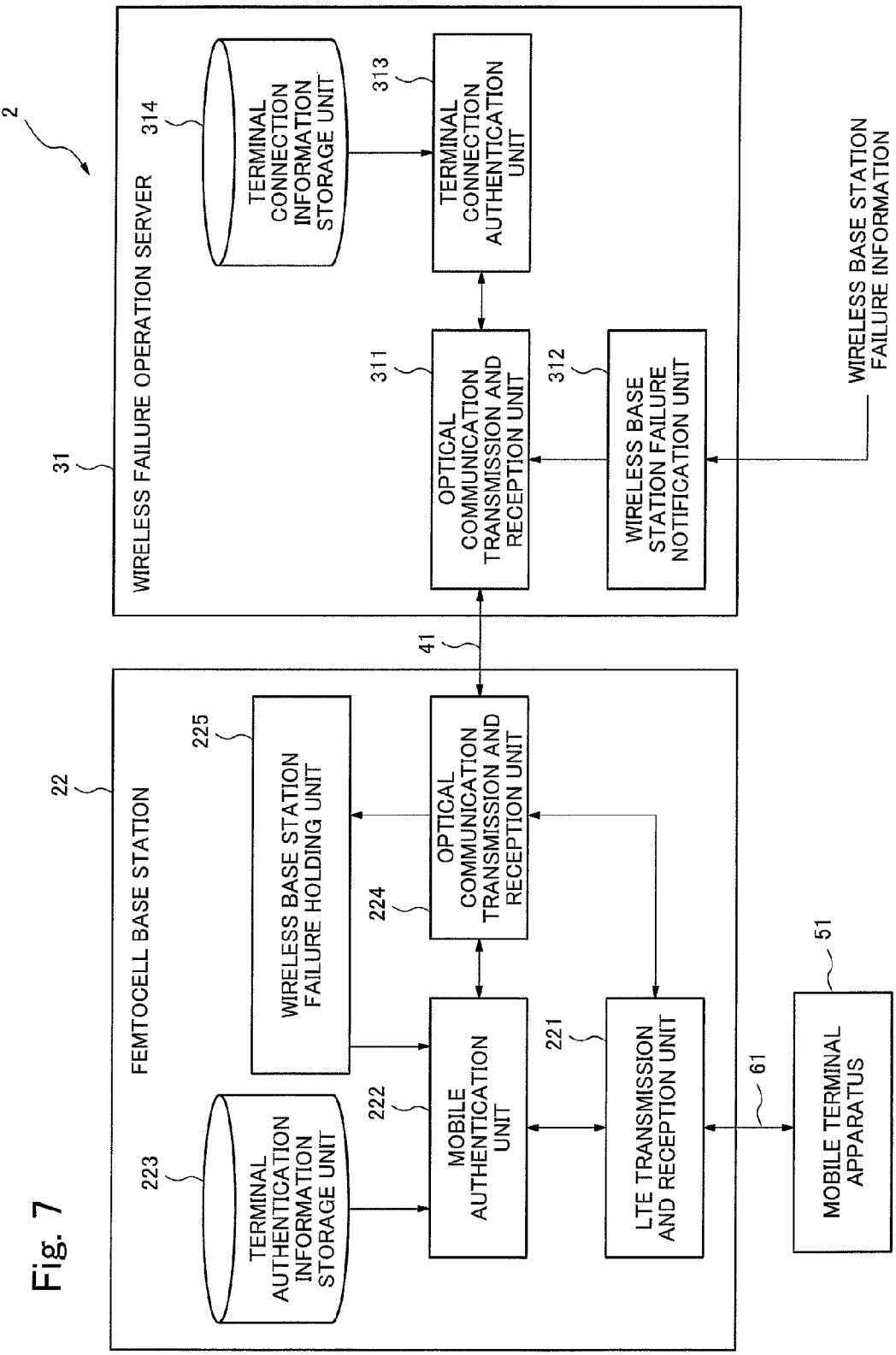
[FIG. 7] a block diagram showing an example of the communication relay system of the first exemplary embodiment

FIG. 7 is the block diagram showing an example of configuration of the communication relay system 2 according to the first example of the present invention.

The communication relay system 2 includes a femtocell base station 22 which connects with a mobile terminal apparatus 51 via the LTE (Long Term Evolution) communication line 61 and a wireless failure operation server 31 which connects with the femtocell base station 22 via an optical communication line 41.

The mobile terminal apparatus 51 corresponds to the mobile communication apparatus 50 according to the first exemplary embodiment, and communicates with the femtocell base station 22 via a LTE communication line 61 according to the example.

The LTE communication line 61 corresponds to the wireless communication 60 according to the first exemplary embodiment, and is a wireless communication line using LTE as the wireless communication.

The optical communication line 41 corresponds to the wired communication network 40 according to the first exemplary embodiment, and is a communication line using light.

The femtocell base station 22 includes a LTE transmission and reception unit 221, a mobile authentication unit 222, a mobile terminal information storage unit 223, an optical communication transmission and reception unit 224 and a wireless base station failure holding unit 225.

The LTE transmission and reception unit 221 corresponds to the wireless transmission and reception unit 201 according to the first exemplary embodiment, and connects with the mobile terminal apparatus 51 via the LTE communication line 61.

The mobile authentication unit 222 corresponds to the terminal authentication unit 202, and authenticates the mobile terminal apparatus 51 (first authentication).

The mobile terminal information storage unit 223 corresponds to the terminal authentication information storage unit 203, and stores the authentication information (terminal information) which is used for the authentication (first authentication) of the mobile authentication unit 222.

The optical communication transmission and reception unit 224 corresponds to the wired transmission and reception unit 204, and connects with the optical communication line 41.

The wireless base station failure holding unit 225 corresponds to the emergency permission holding unit 205, and holds failure information of the wireless base station which is not shown in the figure.

The femtocell base station 22 connects the communication of the registered mobile terminal apparatus 51 in a normal state as a base station for femtocell, and connects the communication of the unregistered mobile terminal apparatus 51 in the case that failures occur at the wireless base station which is not shown in the figure.

The wireless failure operation server 31 includes an optical communication transmission and reception unit 311, a wireless base station failure notification unit 312, a terminal connection authentication unit 313 and a terminal connection information storage unit 314.

The optical communication transmission and reception unit 311 corresponds to the wired transmission and reception unit 301 according to the first exemplary embodiment, and communicates with the femtocell base station 22 via the optical communication line 41.

The wireless base station failure notification unit 312 corresponds to the emergency permission notification unit 302, receives failure information of the wireless base station which is not shown in the figure, holds it and notifies the failure information to the femtocell base station 22 of via the optical communication transmission and reception unit 311.

The terminal connection authentication unit 313 corresponds to the emergency connection authentication unit 303, and authenticates the unregistered mobile terminal apparatus 51 (second authentication) while the failure information is held.

The terminal connection information storage unit 314 corresponds to the emergency connection information storage unit 304, and holds the authentication information (terminal information) which the terminal connection authentication unit 313 uses at the authentication (second authentication).

In the case that a failure occurs at a wireless base station which is not shown in the figure, the wireless failure operation server 31 notifies the failure information to the femtocell base station 22 via the optical communication line 41, and authenticates the unregistered mobile terminal apparatus 51 which requested the connection with the femtocell base station 22 (second authentication).

Then, the processes of the first example will be described with reference to the drawing.

Figure 8:
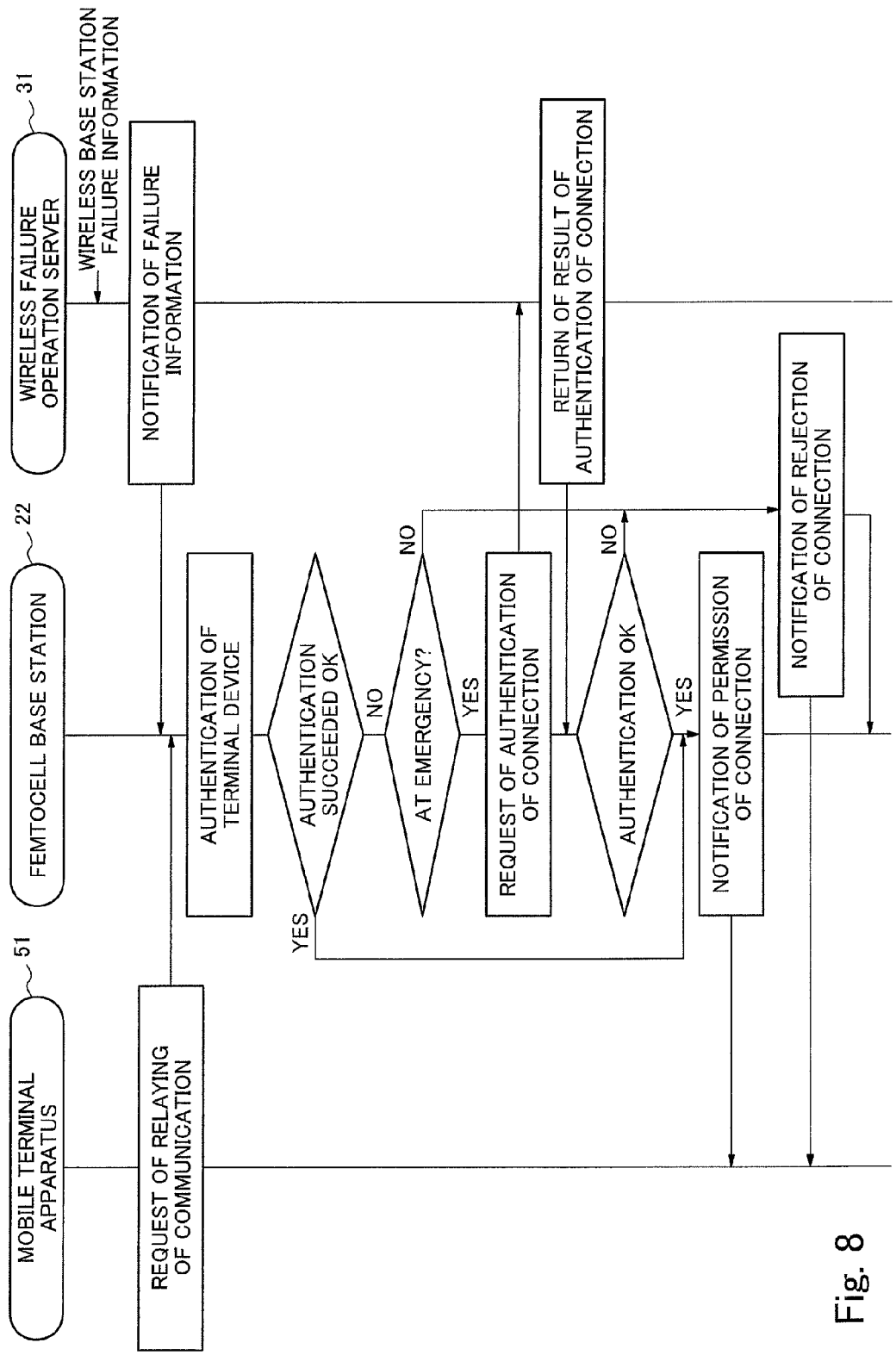
[FIG. 8] a sequence diagram showing an example of process of the first exemplary embodiment

FIG. 8 is the sequence diagram showing an example of process of the first example.

The wireless base station failure notification unit 312 of the wireless failure operation server 31, which received the failure information of the wireless base station which is not shown in the figure, notifies the failure information to the femtocell base station 22 via the optical communication transmission and reception unit 311. The wireless base station failure holding unit 225 of the femtocell base station 22, which received the notification of the failure information, holds the failure information.

Because the failure occurred in the wireless base station, the unregistered mobile terminal apparatus 51, which is not registered to the femtocell base station 22, cannot communicate with a normal wireless base station. Accordingly, the unregistered mobile terminal apparatus 51 transmits the request of the connection to the connectable femtocell base station 22 via the LTE communication line 61.

The mobile authentication unit 222 of the femtocell base station 22, which receives a request of the connection via the LTE transmission and reception unit 221, authenticates the mobile terminal apparatus 51 (first authentication). That is, the mobile authentication unit 222 confirms whether or not the requested mobile terminal apparatus 51 is stored in the mobile terminal information storage unit 223.

In the case of the registered mobile terminal apparatus 51, the mobile terminal information storage unit 223 stores information of the mobile terminal apparatus 51. Therefore, the result of the first authentication by the mobile authentication unit 222 becomes permission, and the mobile authentication unit 222 permits the connection of the registered mobile terminal apparatus 51.

However, because the mobile terminal apparatus 51 which transmitted the request of the connection at this time is unregistered, it is not registered in the mobile terminal information storage unit 223 in advance. Therefore, the result of the first authentication by the mobile authentication unit 222 becomes non-permission.

Accordingly, the mobile authentication unit 222 confirms whether or not the failure information is held in the wireless base station failure holding unit 225. Because the failure information is already held in the wireless base station failure holding unit 225, the mobile authentication unit 222 sends an inquiry of whether or not the mobile terminal apparatus 51, which has requested the connection, is a connection object at the failure (in other word, second authentication) to the wireless failure operation server 31 via the optical communication transmission and reception unit 224.

The terminal connection authentication unit 313, which receives the inquiry of the second authentication from the femtocell base station 22 via the optical communication transmission and reception unit 311, authenticates the mobile terminal apparatus 51 based on whether or not information of the mobile terminal apparatus 51 of the authentication target object is stored in the terminal connection information storage unit 314 (second authentication). Then, the terminal connection authentication unit 313 returns the result of the second authentication to the femtocell base station 22 via the optical communication transmission and reception unit 311.

The mobile authentication unit 222, which receives the result of the second authentication of the mobile terminal apparatus 51 from the wireless failure operation server 31 via the optical communication transmission and reception unit 224, corresponds to the request of the mobile terminal apparatus 51 based on the result. In other words, in the case that a result of the authentication is permission, the mobile authentication unit 222 answers permission of the connection to the mobile terminal apparatus 51, and starts relaying of the communication. On the other hand, in the case that the result of the authentication is non-permission, the mobile authentication unit 222 answers rejection of the connection to the mobile terminal apparatus 51, and finishes the communication.

Thus, the communication relay system 2 according to the first example can have an effect that it can relay the communication of the unregistered mobile terminal apparatus 51, even when the failure occur at the wireless base station.

The reason is because; in the case that the failure occur in the wireless base station, the femtocell base station 22 according to the first example connects the unregistered mobile terminal apparatus 51 based on the notification of the failure information from the wireless failure operation server 31 and a result of the authentication of the mobile terminal apparatus 51.

(Second Exemplary Embodiment)

The emergency connection authentication unit 303 and the emergency connection information storage unit 304 according to the first exemplary embodiment are included and configured in the emergency operation server 30. However, location of the emergency connection authentication unit 303 is not limited to the configuration.

Figure 9:
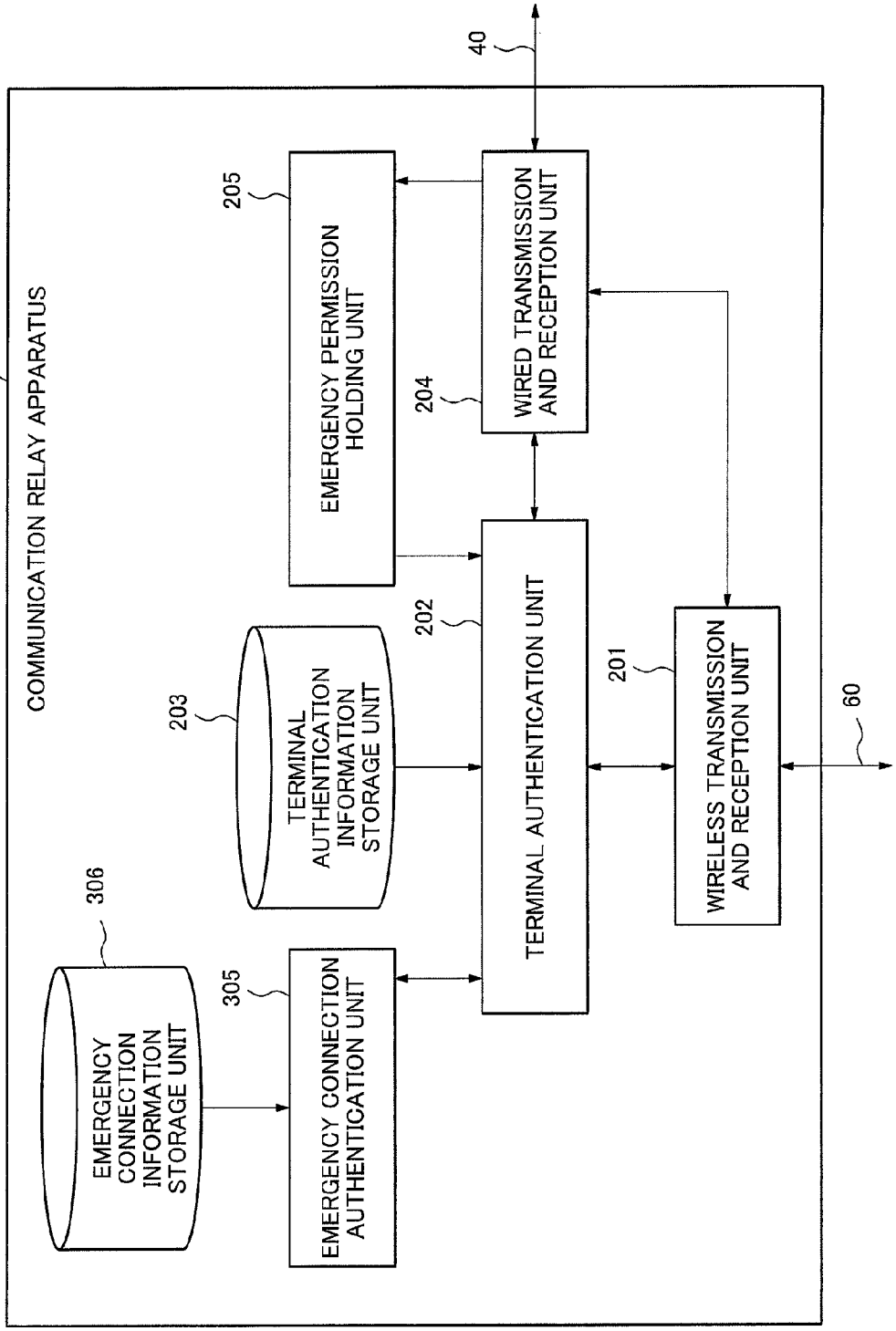
[FIG. 9] a block diagram showing an example of the communication relay apparatus according to the second exemplary embodiment

FIG. 9 is the block diagram showing an example of a communication relay apparatus 23 according to the second exemplary embodiment. Further, in FIG. 9, the same configurations as the first exemplary embodiment are attached the same codes and the detailed descriptions are omitted.

The communication relay apparatus 23 according to the second exemplary embodiment includes an emergency connection authentication unit 305 and an emergency connection information storage unit 306 in addition to the configuration of the communication relay apparatus 20 according to the first exemplary embodiment.

The emergency connection authentication unit 305 authenticates the mobile communication apparatus 50 (second authentication) based on information in the emergency connection information storage unit 306 in the same way as that of the emergency connection authentication unit 303 according to the first exemplary embodiment when the emergency operation requesting information is held.

The emergency connection information storage unit 306 stores information (terminal information) which the emergency connection authentication unit 305 uses for the authentication (second authentication) in the same way as that of the emergency connection information storage unit 304 of the emergency operation server 30. However, the emergency connection information storage unit 306 receives information in relation to the communication relay apparatus 23 from the emergency operation server 30 and stores it.

The communication relay apparatus 23, which is configured as described above, executes in the same way as that of the communication relay apparatus 20 according to the first exemplary embodiment, except for the process of the authentication of the mobile communication apparatus 50 which is not stored in the terminal authentication information storage unit 203, in other words, is not registered (second authentication). Therefore, the descriptions of the similar processes will be omitted, and the authentication (second authentication) process peculiar to the second exemplary embodiment will be described in detail.

The communication relay apparatus 23, which receives a request of the connection from the mobile communication apparatus 50 executes to Step 1005 in FIG. 4 in the same way as that of the communication relay apparatus 20 according to the first exemplary embodiment, it. In the case that the emergency operation requesting information exists in Step 1005, the terminal authentication unit 202 of the communication relay apparatus 23 does not inquire to the emergency operation server 30 but request the authentication (second authentication) of the mobile communication apparatus 50 to the emergency connection authentication unit 305 in it. The emergency connection authentication unit 305, which receives the request of the authentication (second authentication), acquires a result of the authentication based on whether or not information of the mobile communication apparatus 50 (terminal information) is stored in the emergency connection information storage unit 306, and returns it to the terminal authentication unit 202.

The following processes of the terminal authentication unit 202 after it received the result of the authentication are similar to the processes from Step 1007 in FIG. 4. The terminal authentication unit 202 permits the connection of the mobile communication apparatus 50 in the case that the authentication is succeeded, and it refuses the connection of the mobile communication apparatus 50 in the case that the authentication is failed. Other processes of the communication relay apparatus 23 are similar to the communication relay apparatus 20 according to the first exemplary embodiment.

Based on these processes, the communication relay apparatus 23 according to the second exemplary embodiment can permit the connection of the mobile communication apparatus 50 of the emergency operation requesting object, in the same way as that of the first communication relay apparatus 20.

The communication relay apparatus 23 according to the second exemplary embodiment can have an effect that it promptly secures a communication path for the mobile communication apparatus 50 which is the emergency operation requesting object, in addition to the effect according to the first exemplary embodiment.

The reason is because; the communication relay apparatus 23 according to the second exemplary embodiment includes the emergency connection authentication unit 305 in it. In other words, comparing with the communication relay apparatus 20 according to the first exemplary embodiment which executes the second authentication using the wired communication network 40, the communication relay apparatus 23 executes the second authentication using a data transmission in the apparatus which can promptly exchange data compared with a communication network.

Moreover, the communication relay apparatus 23 according to the second exemplary embodiment can have an effect that it increases capacity of the wired communication network 40.

The reason is because; the communication relay apparatus 23 according to the second exemplary embodiment does not use the wired communication network 40 for the authentication in the case of holding the emergency operation requesting information (second authentication) and does not consume the communication capacity of the wired communication network 40.

Third Exemplary Embodiment

Although the terminal authentication information storage unit 203 according to the first exemplary embodiment is included in the communication relay apparatus 20, it is not limited to this configuration.

Figure 10:
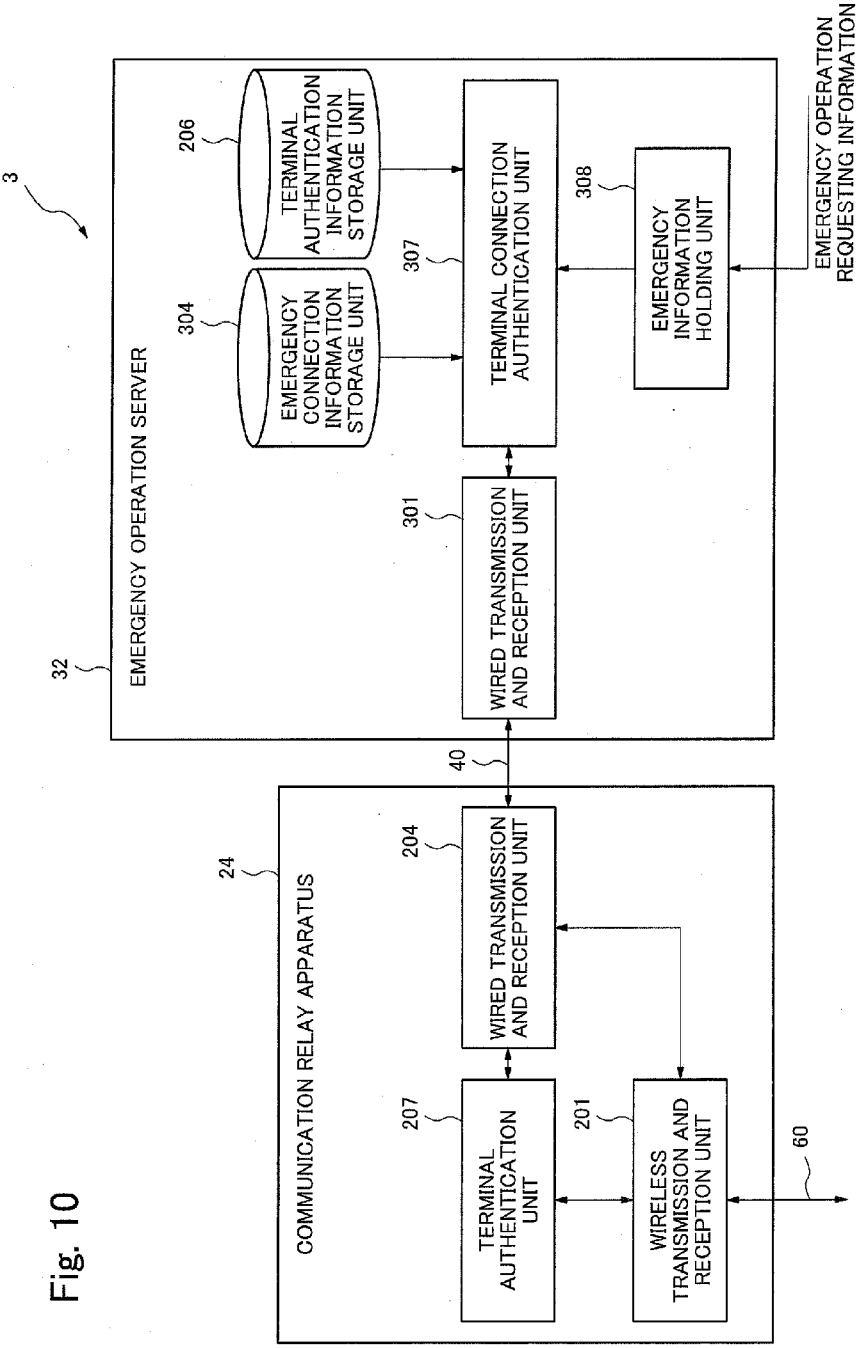
[FIG. 10] a block diagram showing an example of configuration of the communication relay system according to the third exemplary embodiment

FIG. 10 is the block diagram showing an example of configuration of a communication relay system 3 according to the third exemplary embodiment.

The communication relay system 3 according to the third exemplary embodiment contains a terminal authentication information storage unit 206 in an emergency operation server 32. The communication relay system 3 is the same as the communication relay system 1 according to the first exemplary embodiment, except for a communication relay apparatus 24 and the emergency operation server 32. Therefore, the same configurations will be attached the same codes and be omitted the detailed descriptions, and the configurations and the processes peculiar to the third exemplary embodiment will be described in detail.

When comparing with the communication relay apparatus 20 according to the first exemplary embodiment, the communication relay apparatus 24 has a configuration where it removes the terminal authentication information storage unit 203 and the emergency permission holding unit 205. Then, although a terminal authentication unit 207 of the communication relay apparatus 24 similarly executes like the terminal authentication unit 202 according to the first exemplary embodiment, it is different from the terminal authentication unit 202 on the point that it requests the authentication of the registered mobile communication apparatus 50 (first authentication) to the emergency operation server 32, in the same way as the authentication of the mobile communication apparatus 50 of the emergency operation requesting object (second authentication). Further, the configuration of the communication relay apparatus 23 according to the exemplary embodiment has a minimum configuration of the communication relay apparatus according to the present invention.

The emergency operation server 32 includes the wired transmission and reception unit 301, an emergency information holding unit 308, a terminal connection authentication unit 307, the emergency connection information storage unit 304 and the terminal authentication information storage unit 206.

The wired transmission and reception unit 301 exchanges information with the communication relay apparatus 24, in the same way as that of the wired transmission and reception unit 301 according to the first exemplary embodiment.

In the case that the emergency information holding unit 308 receives the emergency operation requesting information from a notification apparatus which is not shown in the figure, it holds the emergency operation requesting information.

The terminal connection authentication unit 307 authenticates the mobile communication apparatus 50 (first authentication and second authentication) requested by the communication relay apparatus 24, using the terminal authentication information storage unit 206 and the emergency connection information storage unit 304.

The emergency connection information storage unit 304 is the same as the emergency connection information storage unit 304 according to the first exemplary embodiment.

The terminal authentication information storage unit 206 holds similar information as that of the terminal authentication information storage unit 203 according to the first exemplary embodiment. However, even though it is different from the terminal authentication information storage unit 203, the terminal authentication information storage unit 206 holds information of the registered mobile communication apparatus 50 (terminal information) of all the communication relay apparatuses 24 which connect with the emergency operation server 32.

Next, the processes of the terminal connection authentication unit 307 will be described with reference to the drawing.

Further, in the communication relay system 3 according to the third exemplary embodiment, because the processes are similar to the first exemplary embodiment except for the processes of the authentication of the mobile communication apparatus 50, the descriptions of the similar processes id omitted and peculiar processes of the terminal connection authentication unit 307 according to the third exemplary embodiment will be described in detail.

Figure 11:
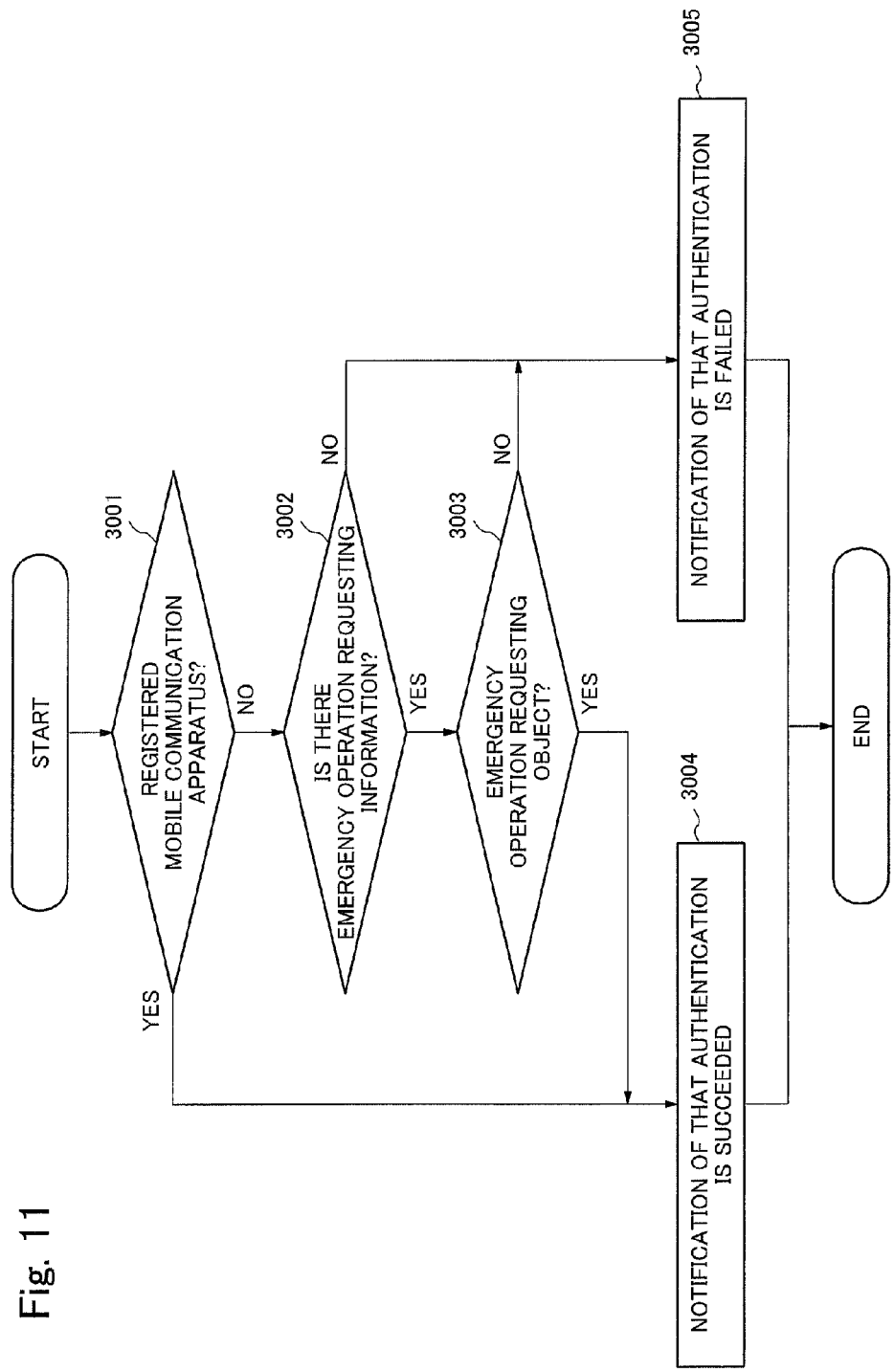
[FIG. 11] a flowchart showing an example of process of a terminal connection authentication unit according to the third exemplary embodiment

FIG. 11 is the flowchart showing an example of process of the terminal connection authentication unit 307 according to the third exemplary embodiment.

The terminal connection authentication unit 307, which receives a request of authentication of the mobile communication apparatus 50 from the communication relay apparatus 24, determines whether or not it is the registered mobile communication apparatus 50 using the terminal authentication information storage unit 206 (Step 3001). Further, the terminal connection authentication unit 307 authenticates the registered mobile communication apparatus 50 using information of the communication relay apparatus 24 (first authentication). This is because; the registered mobile communication apparatus 50 is different on each communication relay apparatus 24.

In the case of the registered mobile communication apparatus 50 (yes, in Step 3001), the terminal connection authentication unit 307 returns a fact that the authentication has succeeded to the communication relay apparatus 24 via the wired transmission and reception unit 301 (Step 3004).

In the case of the unregistered mobile communication apparatus 50 (no, in Step 3001), the terminal connection authentication unit 307 confirms whether or not the emergency operation requesting information is stored in the emergency information holding unit 308 (Step 3002).

In the case that the emergency operation requesting information is not stored (no, in Step 3002), the terminal connection authentication unit 307 returns a fact that the authentication is not succeeded to the communication relay apparatus 24 (Step 3005).

In the case that the emergency operation requesting information is stored (yes, in Step 3002), the terminal connection authentication unit 307 confirms whether or not information of the mobile communication apparatus 50 is stored in the emergency connection information storage unit 304 (Step 3003). The terminal connection authentication unit 307 also uses information of the communication relay apparatus 24 for the authentication at present (second authentication). This is because; the mobile communication apparatus 50 of the emergency operation requesting object is different on each communication relay apparatus 24.

In the case that information of the mobile communication apparatus 50 is stored (yes, in Step 3003), the terminal connection authentication unit 307 returns a fact that the authentication was succeeded to the communication relay apparatus 24 (Step 3004). In the case that information of the mobile communication apparatus 50 is not stored (no, in Step 3003), the terminal connection authentication unit 307 returns a fact that the authentication was not succeeded to the communication relay apparatus 24 (Step 3005).

The communication relay apparatus 24 controls a connection of the mobile communication apparatus 50 based on the result from the emergency operation server 32.

The communication relay system 3 according to the third exemplary embodiment, which executes as is described above, can have an effect of miniaturizing the communication relay apparatus 24 in addition to the effect of the communication relay system 1 according to the first exemplary embodiment.

The reason is because; compared with the communication relay apparatus 20 according to the first exemplary embodiment, the communication relay apparatus 24 according to the third exemplary embodiment can execute even if it neither include the terminal authentication information storage unit 206 nor the emergency permission holding unit 205.

The whole or part of the exemplary embodiments disclosed above can be described as, but not limited to, the following supplementary notes.

[Supplementary Notes]

[Supplementary Note 1]

A communication relay apparatus including a wireless connection unit for connecting with a mobile communication apparatus via a wireless communication path, a wired connection unit for connecting with a wired communication path and an authentication unit for permitting a connection of said mobile communication apparatus with said wired communication path based on a first authentication, and in the case that said first authentication is not succeeded, permitting said connection based on success of a second authentication when information for permitting said connection is registered.

[Supplementary Note 2]

The communication relay apparatus according to the supplementary note 1 further including a terminal authentication information storage unit for storing information for the first authentication of said mobile communication apparatus, wherein said authentication unit permits a connection of said mobile communication apparatus with said wired communication path based on information stored in said terminal authentication information storage unit on authentication of said mobile communication apparatus at said first authentication in the case of connecting a mobile communication apparatus, in which information for said first authentication is stored in said terminal authentication information storage unit, with said wired communication path.

[Supplementary Note 3]

The communication relay apparatus according to the supplementary note 2, wherein said authentication unit permits said connection based on success of said second authentication when information for permitting said connection is registered in the case of connecting a mobile communication apparatus, in which information for said first authentication is not stored in said terminal authentication information storage unit, with said wired communication path.

[Supplementary Note 4]

The communication relay apparatus according to any one of the supplementary notes 1 to 3, further including an emergency permission holding unit for holding information for permitting said connection.

[Supplementary Note 5]

The communication relay apparatus according to any one of the supplementary notes 1 to 4, further including an emergency connection information storage unit for holding information for said second authentication

[Supplementary Note 6]

The communication relay apparatus according to any one of the supplementary notes 1 to 4, wherein said authentication unit inquires said second authentication to an external apparatus when information for permitting said connection is registered.

[Supplementary Note 7]

The communication relay apparatus according to any one of the supplementary notes 1 to 6, wherein said authentication unit requests said first authentication to an external apparatus.

[Supplementary Note 8]

The communication relay apparatus according to any one of the supplementary notes 4 to 7, wherein said emergency permission holding unit receives information for permitting said connection from another apparatus via said wired communication path and holds it.

[Supplementary Note 9]

A communication relay apparatus including:

a wireless connection unit for connecting with a mobile communication apparatus via a wireless communication path, a wired connection unit for connecting with a wired communication path and an authentication unit for permitting a connection of said mobile communication apparatus with said wired communication path based on the first authentication, and permitting said connection based on existence of registration of information for permitting said connection when said first authentication is not succeeded.

[Supplementary Note 10]

The communication relay apparatus according to the supplementary note 9, further including:

a terminal authentication information storage unit for storing information for the first authentication of said mobile communication apparatus, wherein said authentication unit permits a connection of said mobile communication apparatus with said wired communication path based on information stored in said terminal authentication information storage unit for authentication of said mobile communication apparatus at said first authentication in the case of connecting a mobile communication apparatus, in which information for said first authentication is stored in said terminal authentication information storage unit, with said wired communication path.

[Supplementary Note 11]

A communication relay system, including a communication relay apparatus, further including a wireless connection unit for connecting with a mobile communication apparatus via a wireless communication path, a wired connection unit for connecting with a wired communication path and an authentication unit for permitting a connection of said mobile communication apparatus with said wired communication path based on a first authentication, and in the case that said first authentication is not succeeded, permitting said connection based on success of a second authentication when information for permitting said connection is registered and an emergency operation server for authenticating to an inquiry of said second authentication from said authentication unit of said communication relay apparatus when information for permitting said connection is registered.

[Supplementary Note 12]

The communication relay system according to the supplementary note 11, wherein said communication relay apparatus inquires said first authentication and said emergency operation server authenticates.

[Supplementary Note 13]

The communication relay system according to the supplementary note 11 or 12, wherein said communication relay apparatus installs an emergency permission holding unit for holding information for permitting said connection, and said emergency operation server sends information for permitting said connection to said emergency permission holding unit.

[Supplementary Note 14]

A communication relay method, comprising connecting a mobile communication apparatus with a wired communication path via a wireless communication path, and permitting a connection of said mobile communication apparatus with said wired communication path based on a first authentication, and permitting said connection based on success of a second authentication when information for permitting said connection is registered in the case that said first authentication is not succeeded.

[Supplementary Note 15]

The communication relay method according to the supplementary note 14, wherein storing information for the first authentication of said mobile communication apparatus, and permitting a connection of said mobile communication apparatus with said wired communication path based on information for authentication of said mobile communication apparatus at said first authentication in the case of connecting said mobile communication apparatus, in which information for said authentication is stored, with said wired communication path.

[Supplementary Note 16]

The communication relay method according to the supplementary note 15, wherein permitting said connection based on success of said second authentication when information for permitting said connection is registered in the case of connecting a mobile communication apparatus, in which information for said authentication is not stored, with said wired communication path.

[Supplementary Note 17]

The communication relay method according to any one of the supplementary notes 14 to 16, wherein holding information for permitting said connection.

[Supplementary Note 18]

The communication relay method according to any one of the supplementary notes 14 to 17, wherein holding information for said second authentication

[Supplementary Note 19]

The communication relay method according to any one of the supplementary notes 14 to 17, wherein said authentication unit inquires said second authentication to an external apparatus when information for permitting said connection is registered.

[Supplementary Note 20]

The communication relay method according to any one of the supplementary notes 14 to 19, wherein requesting said first authentication to an external apparatus.

[Supplementary Note 21]

The communication relay method according to any one of the supplementary notes 14 to 20, wherein receiving information for permitting said connection from another apparatus via said wired communication path and holding it.

[Supplementary Note 22]

A communication relay method, comprising connecting a mobile communication apparatus with a wired communication path via a wireless communication path, permitting a connection of said mobile communication apparatus with said wired communication path based on a first authentication and permitting said connection based on existence of registration of information for permitting said connection when said first authentication is not succeeded.

[Supplementary Note 23]

The communication relay method according to the supplementary note 23, wherein storing information for the first authentication of said mobile communication apparatus, and permitting a connection of said mobile communication apparatus with said wired communication path based on information for authentication of said mobile communication apparatus at said first authentication in the case of connecting a mobile communication apparatus, in which information for said first authentication is stored, with said wired communication path.

[Supplementary Note 24]

A communication relay program for executing with a computer a process of permitting a connection of a mobile communication apparatus with a wired communication path based on a first authentication, and a process of permitting said connection based on success of a second authentication when information for permitting said connection is registered in the case that said first authentication is not succeeded.

[Supplementary Note 25]

The communication relay program according to the supplementary note 24, wherein a process of storing information for the first authentication of said mobile communication apparatus, and a process of permitting a connection of said mobile communication apparatus with said wired communication path based on information for authentication of said mobile communication apparatus at said first authentication in the case of connecting a mobile communication apparatus, in which information for said authentication is stored, with said wired communication path.

[Supplementary Note 26]

The communication relay program according to the supplementary note 25, wherein a process of permitting said connection based on success of said second authentication when information for permitting said connection is registered in the case of connecting a mobile communication apparatus, in which information for said authentication is not stored, with said wired communication path.

[Supplementary Note 27]

The communication relay program according to any one of the supplementary notes 25 and 26, wherein a process of holding information for permitting said connection.

[Supplementary Note 28]

The communication relay program according to any one of the supplementary notes 25 to 27, wherein a process of holding information for said second authentication.

[Supplementary Note 29]

The communication relay program according to any one of the supplementary notes 25 to 28, wherein a process that said authentication unit inquires said second authentication to an external apparatus when information for permitting said connection is registered.

[Supplementary Note 30]

The communication relay program according to any one of the supplementary notes 25 to 29, wherein a process of requesting said first authentication to an external apparatus.

[Supplementary Note 31]

The communication relay program according to any one of the supplementary notes 25 to 30, wherein a process of receiving information for permitting said connection from another apparatus via said wired communication path and holding it.

[Supplementary Note 32]

A communication relay program for executing with a computer a process of permitting a connection of a mobile communication apparatus with a wired communication path based on a first authentication, and a process of permitting said connection based on judgment of existence of registration of information for permitting said connection when said first authentication is not succeeded.

[Supplementary Note 33]

The communication relay program according to the supplementary note 32, wherein a process of storing information for the first authentication of said mobile communication apparatus and a process of permitting a connection of said mobile communication apparatus with said wired communication path based on information for authentication of said mobile communication apparatus at said first authentication in the case of connecting a mobile communication apparatus, in which information for said authentication is stored, with said wired communication path.

While the invention has been particularly shown and described with reference to exemplary embodiments and examples thereof, the invention is not limited to these embodiments and examples. It will be understood by those of ordinary skill in the art that various changes in form and details may be made therein without departing from the spirit and scope of the present invention as defined by the claims.

This application is based upon and claims the benefit of priority from Japanese patent application No. 2010-136268, filed on Jun. 6, 2010, the disclosure of which is incorporated herein in its entirety by reference.

DESCRIPTION OF CODES 1, 2, 3 communication relay system
9 communication system
20, 21, 23, 24 communication relay apparatus
22 femtocell base station
29 wireless base station
30, 32 emergency operation server
31 wireless failure operation server
40 wired communication network
41 optical communication line
42 dedicated telecommunication network
43 exchange office
44 public switched telephone network
50 mobile communication apparatus
51 mobile terminal apparatus
60 wireless communication path
61 LTE communication line
201 wireless transmission and reception unit
202, 207 terminal authentication unit
203, 206 terminal authentication information storage unit
204 wired transmission and reception unit
205 emergency permission holding unit
221 LTE transmission and reception unit
222 mobile authentication unit
223 mobile terminal information storage unit
224 optical communication transmission and reception unit
225 wireless base station failure holding unit
301 wired transmission and reception unit
302 emergency permission notification unit
303, 305 emergency connection authentication unit
304, 306 emergency connection information storage unit
307 terminal connection authentication unit
308 emergency information holding unit
311 optical communication transmission and reception unit
312 wireless base station failure notification unit
313 terminal connection authentication unit
314 terminal connection information storage unit

The invention claimed is:

1. A communication relay apparatus, comprising:
a wireless connection controller which connects with a mobile communication apparatus via a wireless communication path;
a wired connection controller which connects with a wired communication path;
an authentication controller configured to:
permit a connection of said mobile communication apparatus with said wired communication path based on a first authentication in which information for said first authentication is not stored in a terminal authentication storage unit
inquire a second authentication to an external apparatus having the emergency permission storage unit when information for permitting said connection is registered, the second authentication is performed during a failure of a wireless communication system;
permit said connection in response to said first authentication not succeeding based on success of said second authentication when information for permitting said connection is registered in the case of connecting said mobile communication apparatus with said wired communication path;
said terminal authentication storage unit configured to hold said information for said first authentication; and
an emergency permission storage unit, separate from the terminal authentication storage unit, configured to hold information for said second authentication.

2. The communication relay apparatus according to claim 1, wherein:
said authentication controller permits said connection of said mobile communication apparatus with said wired communication path based on information stored in said terminal authentication information storage unit for authentication of said mobile communication apparatus at said first authentication in the case of connecting said mobile communication apparatus, in which information for said first authentication is stored in said terminal authentication information storage unit, with said wired communication path.

3. A communication relay apparatus, comprising:
a wireless connection controller which connects with a mobile communication apparatus via a wireless communication path;
a wired connection controller which connects with a wired communication path;
an authentication controller configured to:
permit a connection of said mobile communication apparatus with said wired communication path based on a first authentication in which information for said first authentication is not stored in a terminal authentication storage unit;
inquire a second authentication to an external apparatus having the emergency permission storage unit when information for permitting said connection is registered, the second authentication is performed during a failure of a wireless communication system; and
permit said connection in response to said first authentication not succeeding based on existence of registration of information for permitting said connection;
said terminal authentication storage unit configured to hold information for said first authentication; and
an emergency permission storage unit, separate from the terminal authentication storage unit, configured to hold information for said connection based on existence of registration information for permitting said connection when said first authentication is not succeeded.

4. A communication relay method for a communication relay apparatus, comprising
connecting, by a wireless connection controller, a mobile communication apparatus with a wired communication path via a wireless communication path,
permitting, by an authentication controller, a connection of said mobile communication apparatus with said wired communication path based on a first authentication, permitting, by the authentication controller, said connection based on success of a second authentication when information for permitting said connection is registered in the case that said first authentication is not succeeded;

holding, by a terminal authentication storage unit, information for said first authentication;

holding, by an emergency permission storage unit separate from the terminal authentication storage unit, information for said second authentication;

permitting said connection based on success of said second authentication when information for permitting said connection is registered in the case of connecting a mobile communication apparatus with said wired communication path, in which information for said first authentication is not stored in said terminal authentication information storage unit, inquiring said second authentication to an external apparatus, having the emergency permission storage unit, when information for permitting said connection is registered, and performing the second authentication during an emergency which occurs during a failure of a wireless communication system.

5. A non-transitory computer readable medium embodying a program, said program causing a communication relay apparatus to perform a method comprising:

permitting, by an authentication controller, a connection of a mobile communication apparatus with a wired communication path based on a first authentication;

permitting, by the authentication controller, said connection based on success of a second authentication when information for permitting said connection is registered in the case that said first authentication is not succeeded;

holding, by a terminal authentication storage unit, information for said first authentication;

holding, by an emergency permission storage unit separate from the terminal authentication storage unit, information for said second authentication;

permitting said connection based on success of said second authentication when information for permitting said connection is registered in the case of connecting a mobile communication apparatus with said wired communication path, in which information for said first authentication is not stored in said terminal authentication information storage unit, inquiring said second authentication to an external apparatus, having the emergency permission storage unit, when information for permitting said connection is registered, and performing the second authentication during an emergency which occurs during a failure of a wireless communication system.

6. A communication relay apparatus, comprising:

a wireless connecting controller configured for connecting with a mobile communication apparatus via a wireless communication path;

a wired connecting controller configured for connecting with a wired communication path; and an authenticating controller configured for permitting a connection of said mobile communication apparatus with said wired communication path based on a first authentication, and in the case that said first authentication is not succeeded, permitting said connection based on success of a second authentication when information for permitting said connection is registered;

a terminal authentication storage unit configured to hold information for said first authentication; and an emergency permission storage unit, separate from the terminal authentication storage unit, configured to hold information for said second authentication, wherein said authenticating controller permits said connection based on success of said second authentication when information for permitting said connection is registered in the case of connecting a mobile communication apparatus, in which information for said first authentication is not stored in said terminal authentication storage unit, with said wired communication path, said authenticating controller inquires said second authentication to an external apparatus, having the emergency permission storage unit, when information for permitting said connection is registered, and the second authentication is performed during an emergency which occurs during a failure of a wireless communication system.

* * * * *